(12) United States Patent
Wigley et al.

(10) Patent No.: US 12,093,068 B2
(45) Date of Patent: Sep. 17, 2024

(54) SCALABLE LOW DROPOUT REGULATOR HAVING MULTIPLE PASS CIRCUITS

(71) Applicant: Apple Inc., Cupertino, CA (US)

(72) Inventors: Michael P. Wigley, Swindon (GB); Tiago Filipe Galhoz Patrao, Swindon (GB); Mircea-Andrei Lazar, Newbury (GB); Nathan F. Hanagami, San Francisco, CA (US); Jay B. Fletcher, Saratoga, CA (US); Enrico Zanetti, Cascina (IT)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/806,908

(22) Filed: Jun. 14, 2022

(65) Prior Publication Data

US 2023/0400869 A1 Dec. 14, 2023

(51) Int. Cl.
| | |
|---|---|
| G05F 1/575 | (2006.01) |
| G05F 1/46 | (2006.01) |
| G05F 1/565 | (2006.01) |
| H02M 1/00 | (2006.01) |
| H02M 3/158 | (2006.01) |

(52) U.S. Cl.
CPC ............. *G05F 1/575* (2013.01); *G05F 1/468* (2013.01); *G05F 1/565* (2013.01); *H02M 1/0009* (2021.05); *H02M 3/158* (2013.01)

(58) Field of Classification Search
CPC .......... G05F 1/565; G05F 1/575; G05F 1/468; H02M 1/0009; H02M 3/158
See application file for complete search history.

(56) References Cited

U.S. PATENT DOCUMENTS

| | | | |
|---|---|---|---|
| 6,157,178 A * | 12/2000 | Montanari | G05F 1/575 323/273 |
| 7,336,058 B1 | 2/2008 | Lo et al. | |
| 10,031,541 B1 | 7/2018 | Bernardon | |
| 2010/0219687 A1* | 9/2010 | Oh | G05F 1/46 307/39 |
| 2018/0032095 A1* | 2/2018 | Lee | G05F 1/575 |
| 2021/0075321 A1* | 3/2021 | Saccomanno | H02M 3/1588 |
| 2021/0175806 A1 | 6/2021 | Aulagnier et al. | |
| 2022/0187864 A1* | 6/2022 | Pons | G05F 1/468 |

\* cited by examiner

*Primary Examiner* — Jue Zhang
*Assistant Examiner* — Lakaisha Jackson
(74) *Attorney, Agent, or Firm* — Kowert, Hood, Munyon, Rankin & Goetzel, P.C.; Dean M. Munyon

(57) ABSTRACT

A regulator circuit included in a computer system may include a control circuit and multiple pass circuits that source respective supply currents to a regulated power supply node by adjusting respective conductance values between an input power supply node and the regulated power supply node. The number of pass circuits can be adjusted on a design-by-design basis based on a threshold load current for the regulator circuit or on a threshold conductance between the input power supply node and the regulated power supply node. The control circuit adjusts the respective conductance values using a combination of respective sense currents generated by the multiple pass circuits along with a reference voltage and a voltage level of the regulated power supply node.

20 Claims, 21 Drawing Sheets

SCALABLE LOW DROPOUT REGULATOR HAVING MULTIPLE PASS CIRCUITS

BACKGROUND

Technical Field

This disclosure relates to power management in computer systems and, more particularly, to voltage regulator circuit operation.

Description of the Related Art

Modern computer systems may include multiple circuit blocks designed to perform various functions. For example, such circuit blocks may include processors and processor cores configured to execute software or program instructions. Additionally, the circuit blocks may include memory circuits, mixed-signal or analog circuits, and the like.

In some computer systems, the circuit blocks may be designed to operate at different power supply voltage levels. Power management circuits may be included in such computer systems to generate and monitor varying power supply voltage levels for the different circuit blocks.

Power management circuits often include one or more voltage regulator circuits configured to generate regulated voltage levels on respective power supply signals using a voltage level of an input power supply signal. Such voltage regulator circuits may employ a variety of circuit techniques (e.g., low-dropout regulator circuits) to generate the desired voltage levels based upon the voltage level of the input power supply and expected load currents.

DETAILED DESCRIPTION OF EMBODIMENTS

Figure 1:
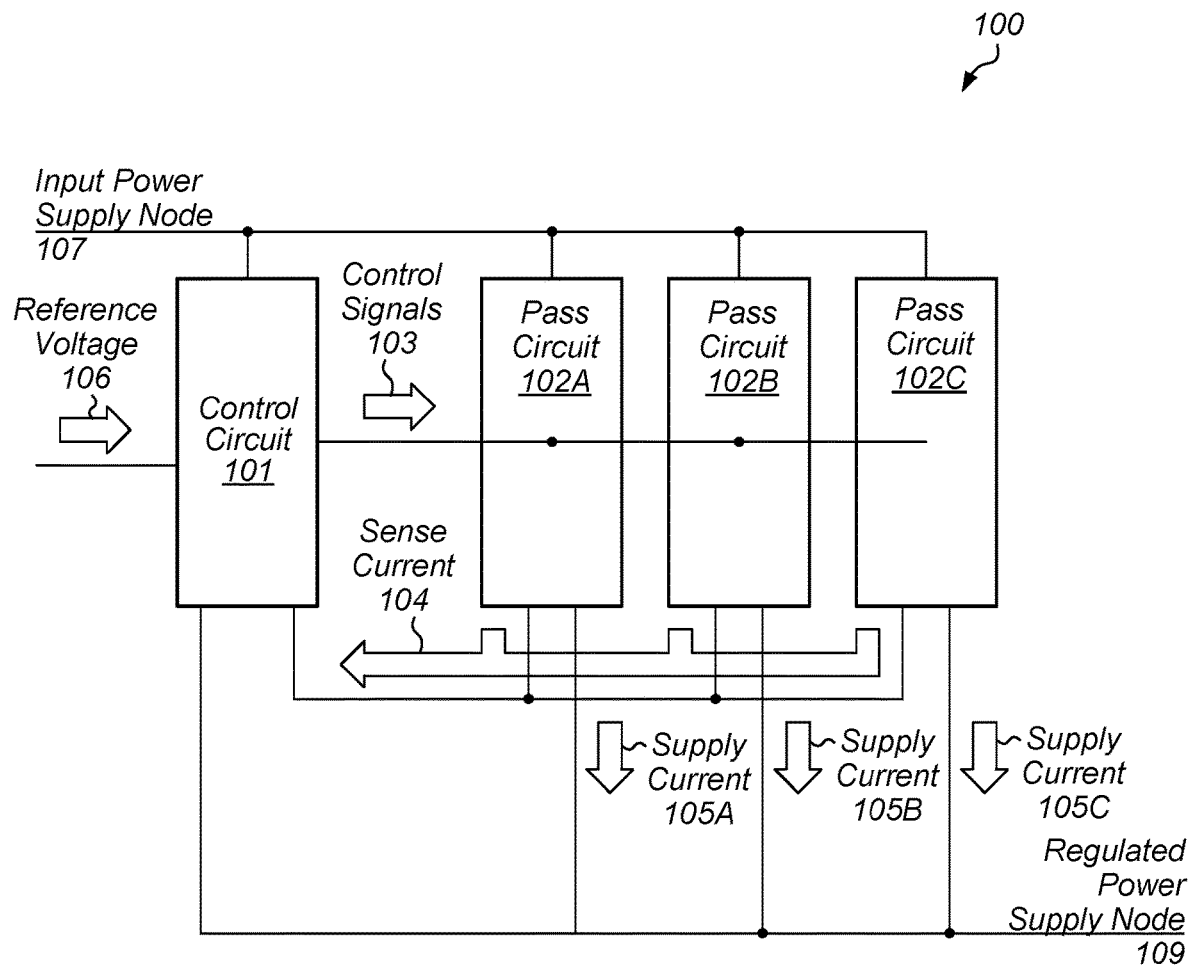
FIG. 1 is a block diagram of an embodiment of a voltage regulator circuit for a computer system.

Computer systems may include multiple circuit blocks configured to perform specific functions. Such circuit blocks may be fabricated on a common substrate and may employ different power supply voltage levels. Power management units (commonly referred to as "PMUs") may include multiple voltage regulator circuits configured to generate regulated voltage levels for various power supply signals. Such voltage regulator circuits may employ both passive circuit elements (e.g., inductors, capacitors, etc.) as well as active circuit elements (e.g., transistors, diodes, etc.).

Different types of voltage regulator circuits may be employed based on power requirements of load circuits, available circuit area, and the like. For example, in some applications, buck converters that repeatedly magnetize and de-magnetize an inductor are used to source current to a regulated power supply node. In cases where switching noise from a buck converter would impede circuit operation, a low-dropout (LDO) voltage regulator circuit may be employed. An LDO voltage regulator circuit functions by adjusting a conductance between an input power supply node and a regulated power supply node to maintain a desired voltage level on the regulated power supply node. LDOs are typically characterized by their input-to-output voltage differential (referred to as "dropout voltage"). Using such an approach, an LDO voltage regulator circuit can function even when the desired voltage on the regulated power supply node is close to the voltage level of the input power supply node.

A maximum current or dropout voltage requirement for an LDO voltage regulator circuit can vary from one integrated circuit design to another. Such variation can result in a base LDO voltage regulator circuit design having to be changed each time it is used. Changing the base LDO voltage regulator circuit design can include re-verification of the design as well as re-working the mask design for the circuit, which can be costly in terms of schedule time.

To better provide a base LDO voltage regulator circuit design for multiple integrated circuits, a different architecture for LDO voltage regulator circuits has been developed. In the new architecture, a fixed core circuit is used in conjunction with one or more slice or pass circuits that provide corresponding currents to a regulated power supply node. As used and defined herein, a pass or slice circuit refers to a circuit configured to adjust a conductance between an input power supply node and a regulated power supply node to maintain a desired voltage level on the regulated power supply node. Different target load currents and dropout voltage requirements can be met by adjusting the number of slice circuits coupled to the fixed core circuit. Since the individual components have been verified, changing the overall design by adding or subtracting slice circuits requires little additional verification, saving time during the design process of an integrated circuit. The embodiments illustrated in the drawings and described below provide techniques for implementing a regulator circuit that includes multiple slice or pass circuits that source respective currents to a regulated power supply node, where the number of slice or pass circuits employed is based on a threshold load current that can be drawn from the regulated power supply node.

Turning to FIG. 1, a block diagram of a regulator circuit is depicted. As illustrated, regulator circuit 100 includes pass circuits 102A-C and control circuit 101. It is noted that although three pass circuits are depicted in the embodiment of FIG. 1, in other embodiments any suitable number of pass circuits may be employed. In various embodiments, the number of pass circuits employed may be based on a threshold load current that can be drawn from regulated power supply node 109, or on a threshold conductance between input power supply node 107 and regulated power supply node 109. By basing the number of pass circuits in regulator circuit 100 on load current and/or conductance, the design of regulator circuit 100 can be scaled late in the design process by adding or subtracting pass circuits to meet design targets for the load current and/or conductance between input power supply 107 and regulated power supply node 109.

Pass circuits 102A-C are coupled to input power supply node 107 and regulated power supply node 109, and are configured to source supply currents 105A-C to regulated power supply node 109 using control signals 103 and a voltage level of input power supply node 107. Pass circuits 102A-C are further configured to generate sense current 104 whose value is indicative of a total supply current being sourced to regulated power supply node 109.

Control circuit 101 is configured to generate control signals 103 using a voltage level of regulated power supply node 109, reference voltage 106, and sense current 104. As described below, control signals 103 may include both analog and digital signals. One or more analog signals may be used to adjust the conductance of pass circuits 102A-C between input power supply node 107 and regulated power supply node 109. One or more digital signals may be used to control a number of pass circuits 102A-C that contribute to sense current 104 in order to adjust a limit on the total current that can be sourced to regulated power supply node 109. It is noted that in some cases, control signals 103 may be used to enable or disable particular ones of pass circuits 102A-102C as the demand for current drawn from regulated power supply node 109 varies.

Figure 2:
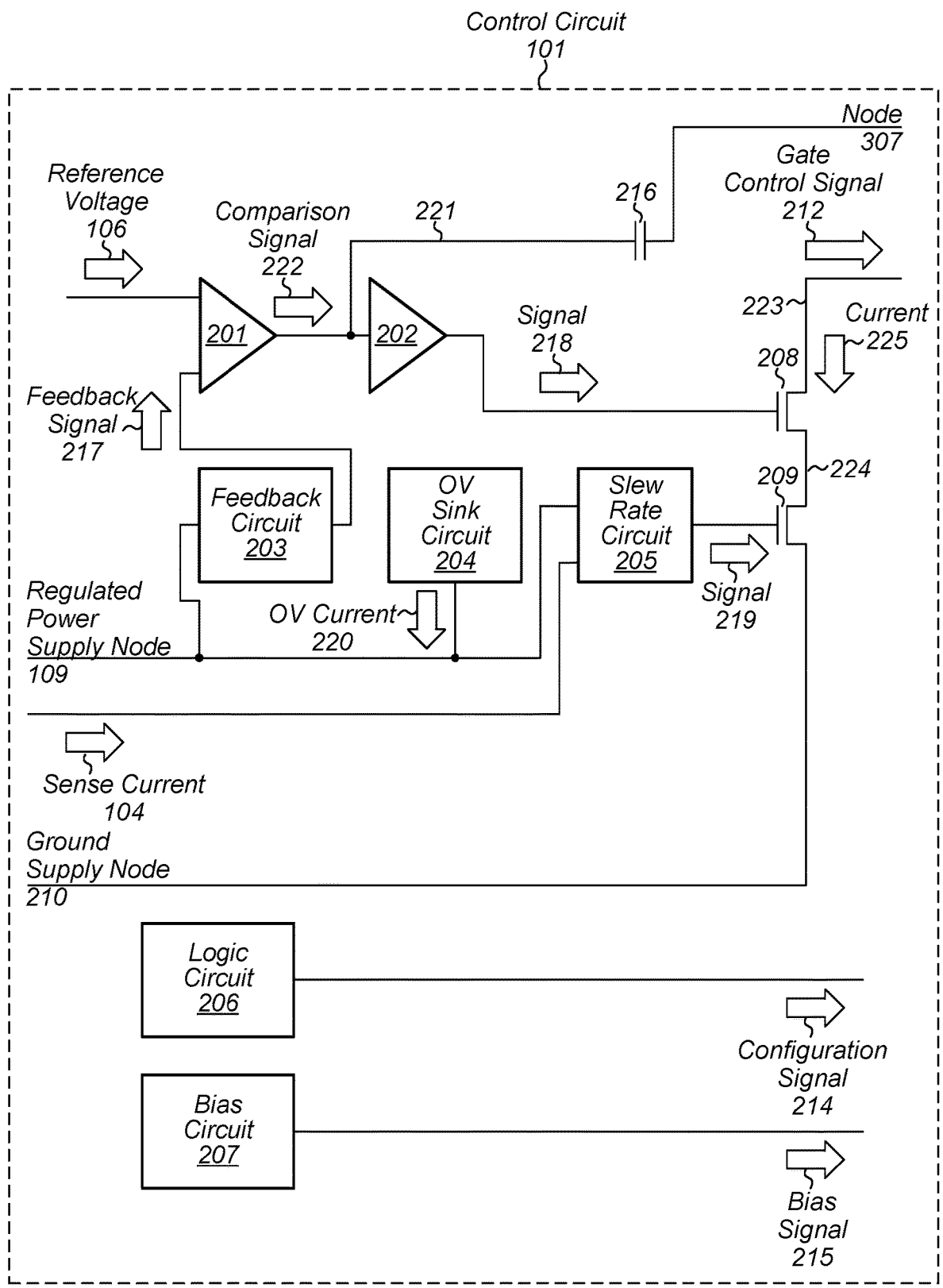
FIG. 2 is a block diagram of an embodiment of a control circuit included in a voltage regulator circuit.

Turning to FIG. 2, a block diagram of an embodiment of control circuit 101 is depicted. As illustrated, control circuit 101 includes comparator circuit 201, amplifier circuit 202, feedback circuit 203, an over-voltage sink circuit (denoted as "OV sink circuit 204"), slew rate circuit 205, logic circuit 206, bias circuit 207, device 208, and device 209.

Feedback circuit 203 is configured to generate feedback signal 217 using a voltage level of regulated power supply node 109. In some embodiments, feedback circuit 203 may be implemented using a voltage divider circuit configured to generate feedback signal 217 such that a voltage level of feedback signal 217 is less than the voltage level of regulated power supply node 109. In some cases, the amount by which the voltage level of feedback signal 217 is less than the voltage level of regulated power supply node 109 is programmable.

Comparator circuit 201 is configured to generate comparison signal 222 on node 221 using reference voltage 106 and feedback signal 217. In some embodiments, comparator circuit 201 may be configured to generate comparison signal 222 such that a voltage level of comparison signal 222 is proportional to a difference between reference voltage 106 and a voltage level of feedback signal 217. Comparator circuit 201 may, in various embodiments, be implemented using a differential amplifier circuit or any other suitable circuit configured to generate an output signal based on a result of a comparison of two or more input signals. Although comparison signal 222 is depicted as being a single signal, in other embodiments, comparison signal 222 may include two signals whose values differentially encode the difference between feedback signal 217 and reference voltage 106.

It is noted that node 221 is coupled to node 307, which is included in pass circuit 300, via capacitor 216. By coupling node 307 to node 221, an additional pole is introduced in the system of regulator circuit 100 which advances the loop phase of regulator circuit 100 improving stability and reducing ripple on regulated power supply node 109. Although a single capacitor is depicted in the embodiment of FIG. 2, in other embodiments, node 221 may be coupled, in parallel, to node 307 of multiple pass circuits using multiple capacitors. Capacitor 216 may, in various embodiments, be implemented using a metal-oxide-metal (MOM) structure, a metal-insulator-metal (MIM) structure, or any other suitable capacitor structure available on a semiconductor manufacturing process.

Amplifier circuit 202 is configured to generate signal 218 using comparison signal 222. In various embodiments, amplifier circuit 202 is configured to increase a magnitude of comparison signal 222 and/or to provide additional drive strength in order to drive the capacitive load of device 208. Amplifier circuit 202 can, in various embodiments, be implemented using any suitable single-ended or differential amplifier circuit.

Slew rate circuit 205 is configured to generate signal 219 using sense current 104. In various embodiments, slew rate circuit 205 is configured to adjust a voltage of signal 219 based on a time-rate of change of sense current 104. For example, an increase in the time-rate of change of sense current 104 can result in a decrease in the voltage level of signal 219, which can lead to a decrease in current 225 and an increase in gate control signal 212. By adjusting the value of gate control signal 212 in this fashion, the influence of rapid changes in sense current 104 can be limited, thereby improving the stability of regulator circuit 100.

Device 208 is coupled between node 223 and node 224 and is controlled by signal 218. Device 209 is coupled between node 224 and ground supply node 210 and is controlled by signal 219. Together, device 208 and device 209 are configured to sink current 225 from node 223 to generate gate control signal 212. In various embodiments, to generate current 225, device 208 and device 209 adjust a conductance between node 223 and ground supply node 210 based on the values of signals 218 and 219. In various embodiments, devices 208 and 209 may be implemented as n-channel metal-oxide semiconductor field-effect transistors (MOSFETs), fin field-effect transistors (FinFETs), gate-all-around field-effect transistors (GAAFETs), or any other suitable transconductance devices.

OV sink circuit 204 is configured to sink OV current 220 from regulated power supply node 109 in response to a detection that a voltage level of regulated power supply node 109 is greater than a threshold value. In various embodiments, OV sink circuit 204 may be implemented using a comparator circuit configured to compare the voltage level of regulated power supply node 109 to the threshold value. OV sink circuit 204 may also be implemented using one or more devices configured to couple regulated power supply node 109 to ground supply node 210 based on a result of comparing the voltage level of regulated power supply node 109 to the threshold value.

Logic circuit 206 is configured to generate configuration signal 214, which may be included in control signals 103. In some embodiments, logic circuit 206 may be further configured to set configuration signal 214 to a particular value during a startup time period to limit the total current being sourced to regulated power supply node 109. Logic circuit 206 may also be configured to, after a given time period has elapsed, set configuration signal 214 to a different value to reduce a value of sense current 104 by disabling one or more of pass circuits 102A-102C from generating their corresponding contributions to sense current 104. It is noted that although depicted as a single signal, in various embodiments, configuration signal 214 may include multiple bits, each routed to a different one of pass circuits 102A-102C. In various embodiments, logic circuit 206 may be implemented using a microcontroller, state machine, or any other suitable combination of combinatorial and sequential logic circuits.

Bias circuit 207 is configured to generate bias signal 215, which may be included in control signals 103. In various embodiments, bias circuit 207 may be implemented using a supply-voltage independent and/or temperature independent reference circuit along with one or more current mirror circuits, or any other suitable combination of circuits configured to generate a constant voltage or current signal that can be used to bias other circuits.

Figure 3:
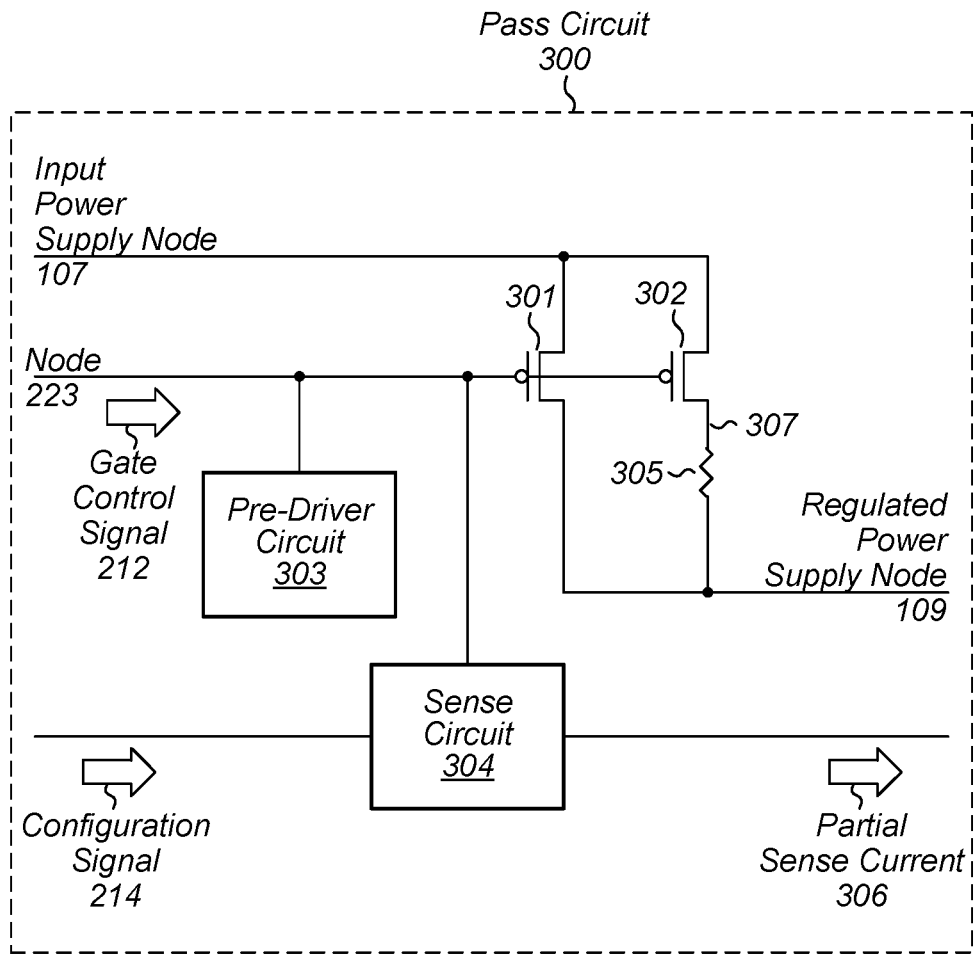
FIG. 3 is a block diagram of an embodiment of a pass circuit for a voltage regulator circuit.

Turning to FIG. 3, a block diagram of an embodiment of pass circuit 300 is depicted. As illustrated, pass circuit 300 includes device 301, device 302, pre-driver circuit 303, sense circuit 304, and resistor 305. In various embodiments, pass circuit 300 may correspond to any of pass circuits 102A-102C.

Device 301 is coupled between input power supply node 107 and regulated power supply node 109, and is configured to adjust a conductance between input power supply node 107 and regulated power supply node 109 using gate control signal 212. In a similar fashion, device 302 is coupled between input power supply node 107 and node 307, which is, in turn, coupled to resistor 305, which is further coupled to regulated power supply node 109. The conductance of device 302 is also controlled by gate control signal 212. As described above, the voltage generated across resistor 305 on node 307 is used as a feedback signal to improve the stability of regulator circuit 100 and reduce the ripple on regulated power supply node 109 by providing faster feedback of changes in regulated power supply node 109 to control circuit 101.

Although device 301 and device 302 are depicted as being single devices in the embodiment of FIG. 3, in other embodiments, device 301 and device 302 may be implemented using multiple devices connected in parallel. Devices 301 and 302 may be implemented as p-channel MOSFETs, FinFETs, GAAFETs, or any other suitable transconductance devices. Resistor 305 may be implemented using metal, polysilicon, diffusion, or any other suitable material available in a semiconductor manufacturing process.

Pre-driver circuit 303 is configured to source a current to node 223 as part of the generation of gate control signal 212. In various embodiments, pre-driver circuit 303 may be implemented as a non-linear current mirror to improve stability of regulator circuit 100 across different load currents.

Sense circuit 304 is configured to generate partial sense current 306 using gate control signal 212 and configuration signal 214. In various embodiments, partial sense current 306 may be combined with other partial sense currents from other pass circuits to form sense current 104. As described below, sense circuit 304 may be further configured to disable the generation of partial sense current 306 based on a value of configuration signal 214.

Figure 4:
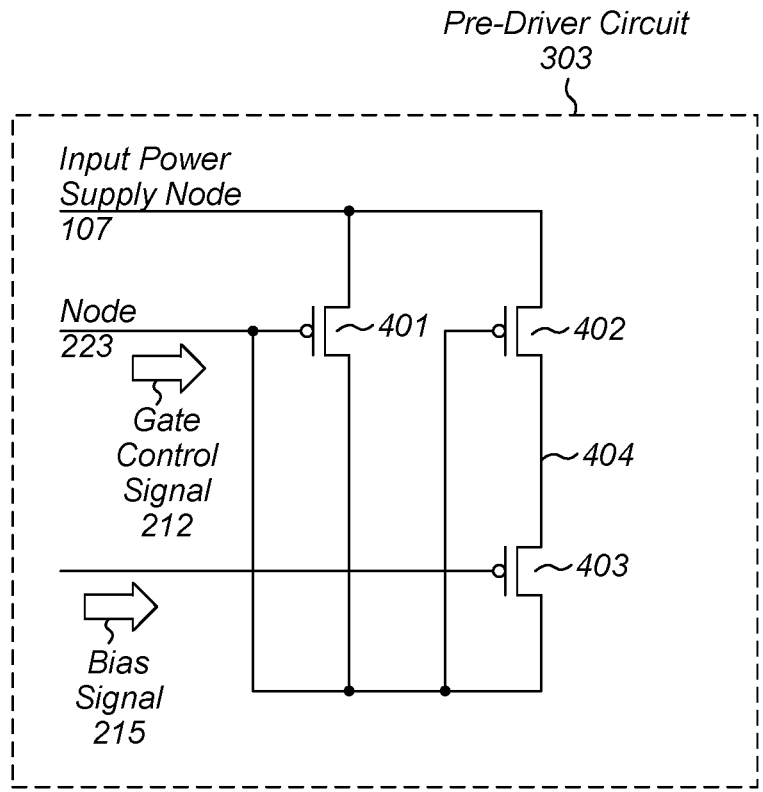
FIG. 4 is a block diagram of an embodiment of a pre-driver circuit for a voltage regulator circuit.

Turning to FIG. 4, a block diagram of pre-driver circuit 303 is depicted. As illustrated, pre-driver circuit 303 includes devices 401-403. It is noted that although devices 401-403 are depicted as being individual devices, in other embodiments, each of devices 401-403 may be implemented as multiple devices in parallel. In various embodiments, devices 401-403 may be implemented as p-channel MOSFETs, FinFETs, GAAFETs, or any other suitable transconductance devices.

Device 401 is coupled between input power supply node 107 and node 223 and is controlled by gate control signal 212. In a similar fashion, device 402 is coupled between input power supply node 107 and node 404, and is also controlled by gate control signal 212. Device 403 is coupled between node 404 and node 223, and is controlled by bias signal 215.

As described above, devices 401-403 form a non-linear current mirror circuit that is configured to generate an output current where a ratio of an input current to the output current is input-dependent in a controlled fashion. The response of the non-linear current mirror circuit can be adjusted using bias signal 215 to account for variations in load current across different regulator circuit implementations using multiple copies of pass circuit 300 to improve stability of the different regulator circuit implementations.

Figure 5:
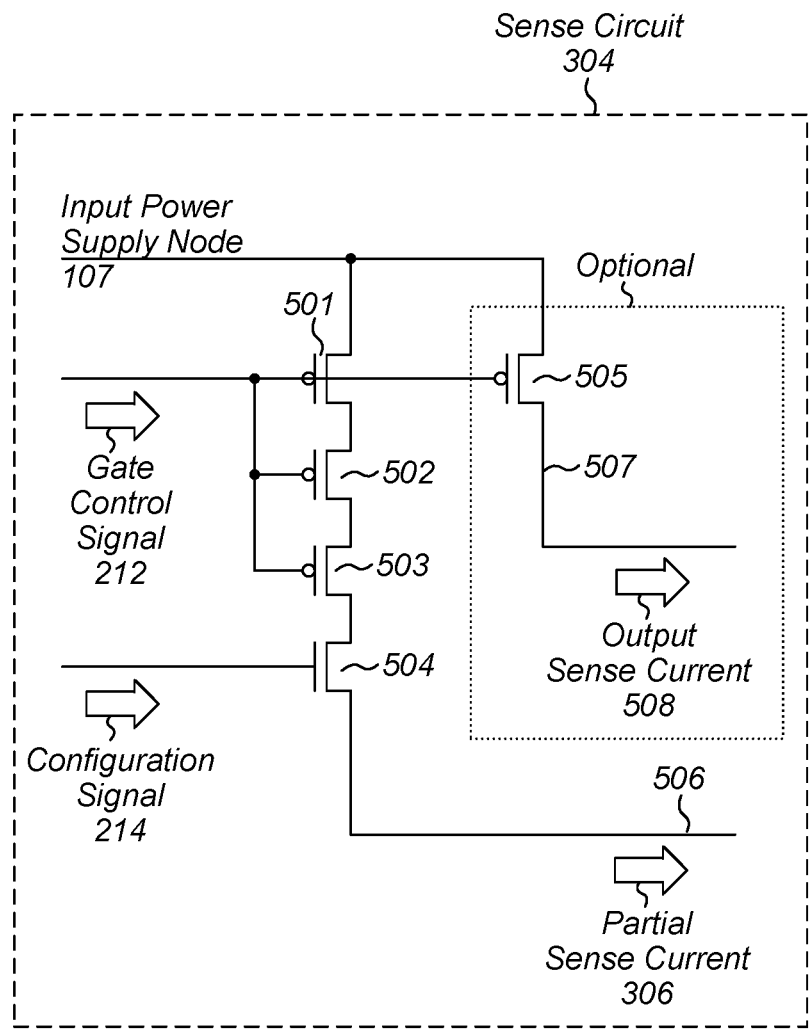
FIG. 5 is a block diagram of an embodiment of a sensor circuit for a voltage regulator circuit.

Turning to FIG. 5, a block diagram of an embodiment of sense circuit 304 is depicted. As illustrated, sense circuit 304 includes devices 501-505. It is noted that although devices 501-505 are depicted as single devices in the embodiment of FIG. 5, in other embodiments, each of devices 501-505 may be implemented using multiple devices connected in parallel. In various embodiments, devices 501-503 and 505 may be implemented as p-channel MOSFETs, FinFETs, GAAFETs, or any other suitable transconductance devices, while device 504 may be implemented as an n-channel MOSFET, FinFET, GAAFET, or any other suitable transconductance device.

Devices 501-503 are coupled, in series, between input power supply node 107 and device 504. Each of devices 501-503 are controlled by gate control signal 212. Device 504 is coupled between device 503 and node 506. Devices 501-503 are configured to generate partial sense current 306 based on a voltage level of gate control signal 212, while device 504 is configured to selectively couple or de-couple the combination of devices 501-503 from node 506. When device 504 is active, in response to a particular value of configuration signal 214, partial sense current 306 flows onto node 506 to combine with other partial sense currents generated by other pass circuits to generate sense current 104. When device 504 is inactive, in response to a different value of configuration signal 214, devices 501-503 are de-coupled from node 506, and partial sense current 306 is disabled from contributing to sense current 104.

In order for control circuit 101 to not have to deal with a value of sense current 104 that is as high as the total supply current being sourced to regulated power supply node 109, physical characteristics, e.g., transistor width, of devices 501-503 may be adjusted relative to device 301 to scale the value of partial sense current 306. In some embodiments, more than three devices may be coupled, in series, between input power supply node 107 and device 504 to further scale partial sense current 306.

In some cases, it is desirable to be able to measure the currents delivered by each pass circuit in a regulator circuit. To accomplish this, optional device 505 is included. Device 505 is coupled between input power supply node 107 and node 507 and is controlled by gate control signal 212, and is configured to generate output sense current 508 based on a voltage level of gate control signal 212. In various embodiments, node 507 may be routed to an on-chip test and measurement circuit, or routed to a solder bump or ball so that an external tester circuit can measure output sense current 508.

Figure 6:
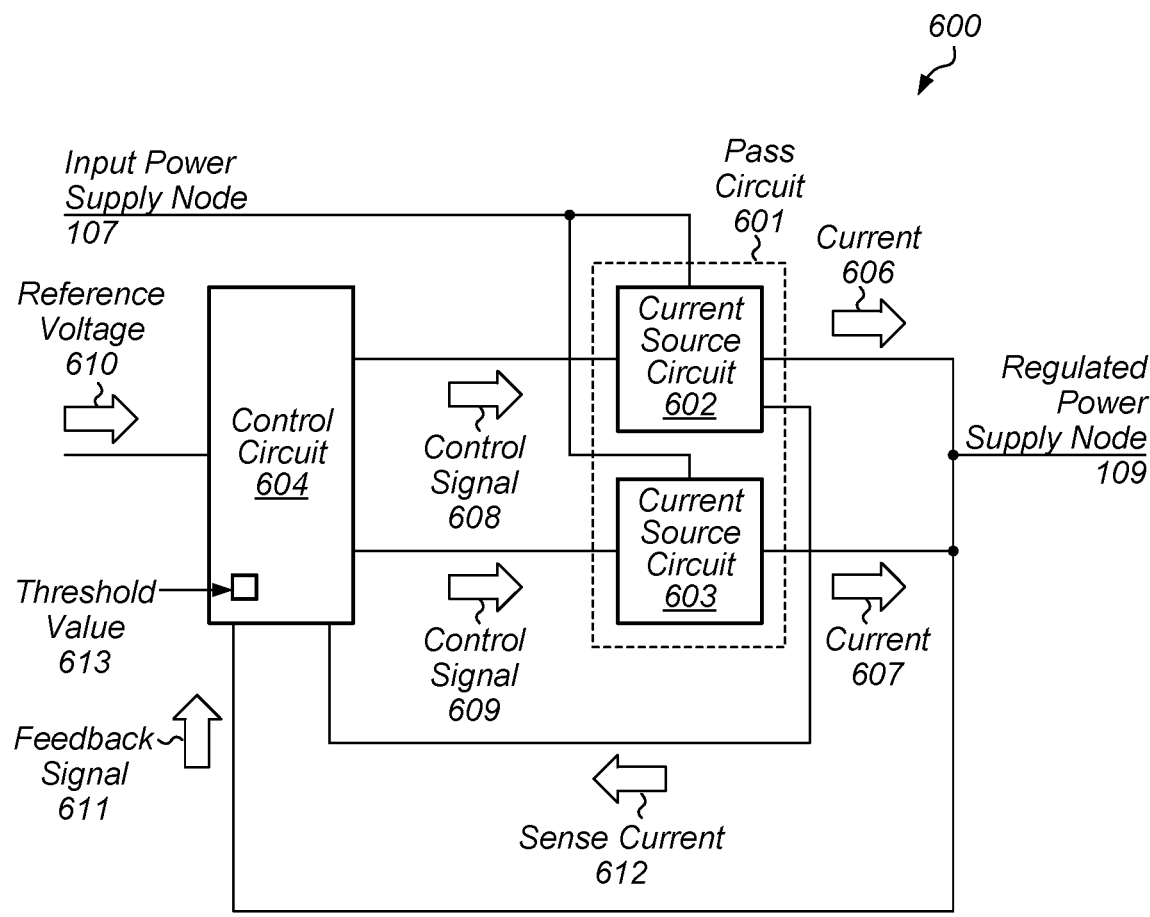
FIG. 6 is a block diagram of another embodiment of a voltage regulator circuit for a computer system.

In various embodiments, different types of voltage regulator circuits can be used in the scalable configuration described above. For example, in some cases, a pass circuit may include multiple current source circuits that can be selectively activated to provide additional current to a regulated power supply node during high-load conditions. A block diagram of an embodiment of a voltage regulator circuit that may be used with the scalable configuration is depicted in FIG. 6. As illustrated, voltage regulator circuit 600 includes pass circuit 601 and control circuit 604. Pass circuit 601 includes current source circuit 602 and current source circuit 603. In various embodiments, control circuit 604 may correspond to control circuit 101, and pass circuit 601 may correspond to one or more of pass circuits 102A-102C.

Current source circuit 602 is configured to source current 606 to regulated power supply node 109 using a voltage level of input power supply node 107 and control signal 608. In various embodiments, current source circuit 602 is also configured to generate sense current 612 whose value is indicative of a total current being sourced to regulated power supply node 109. In cases where multiple pass circuits are employed, individual pass circuits may generate partial sense currents as described above.

Current source circuit 603 is configured to source current 607 to regulated power supply node 109 using the voltage level of input power supply node 107 and control signal 609. In various embodiments, current 607 is greater than current 606.

Control circuit 604 is configured to generate feedback signal 611 using a voltage level of regulated power supply node 109. In various embodiments, control circuit 604 is also configured to generate control signal 608 using reference voltage 610 and feedback signal 611. Additionally, control circuit 604 is configured, in response to a determination that a total current being sourced to regulated power supply node 109 exceeds threshold value 613, to generate control signal 609. To determine that the total current being sourced to regulated power supply node 109 exceeds threshold value 613, control circuit 604 is further configured to compare sense current 612 to threshold value 613. As described below, control circuit 604 includes a voltage-to-current converter circuit configured to generate control signal 609 using a reference signal.

In other embodiments, control circuit 604 is also configured to modify a value of feedback signal 611 in response to the determination that the total current being sourced to the regulated power supply node exceeds threshold value 613, and to deactivate control signal 609 based on a comparison of reference voltage 610 and a modified value of the feedback signal 611.

It is noted that although voltage regulator circuit 600 is described in conjunction with the previously described scalable configuration, in some embodiments, voltage regulator circuit 600 may be implemented using a non-scalable topology.

Figure 7:
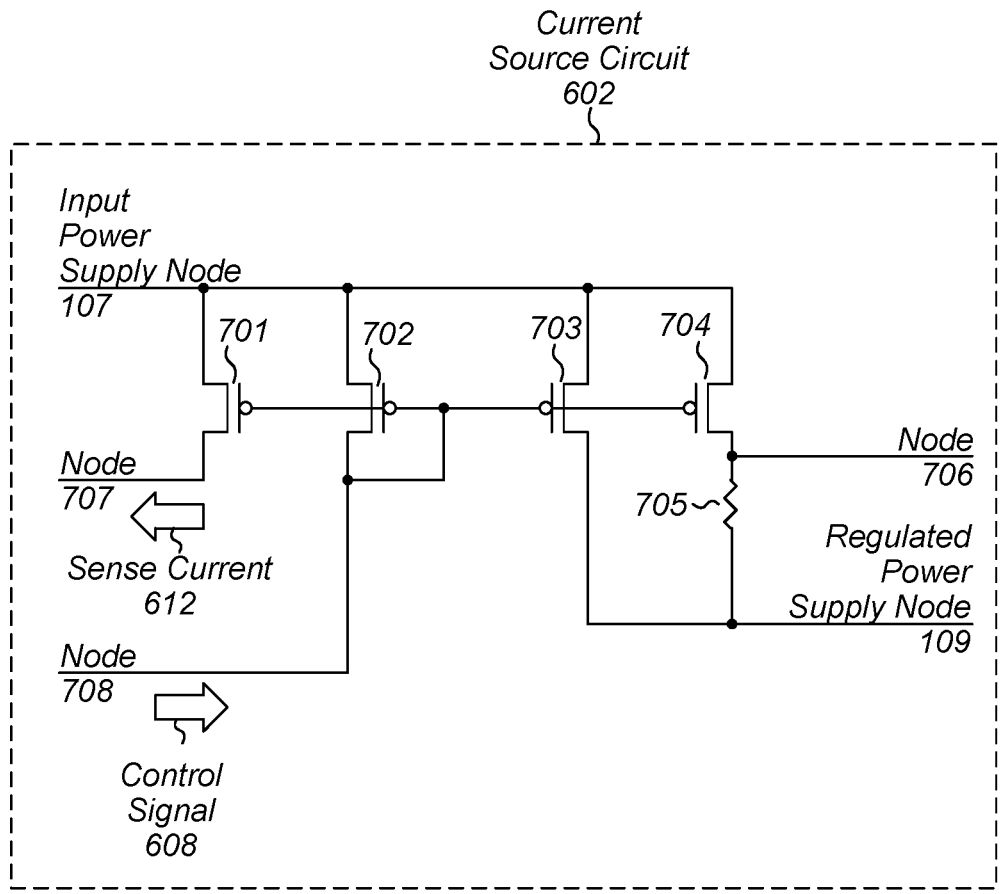
FIG. 7 is a block diagram of another embodiment of a current source circuit for a voltage regulator circuit.

Turning to FIG. 7, a block diagram of current source circuit 602 is depicted. As illustrated, current source circuit 602 includes devices 701-704 and resistor 705.

Device 702 is coupled between input power supply node 108 and node 708 and is controlled by a voltage level of node 708. Device 703 is coupled between input power supply node 107 and regulated power supply node 109, while device 704 is coupled between input power supply node 107 and node 706. Resistor 705 is coupled between node 706 and regulated power supply node 109, while device 701 is coupled between input power supply node 107 and node 707.

Devices 702 and 703 form a current mirror circuit configured to generate a current flowing in device 703 that is a replica of the current flowing in device 702 based on control signal 608. The current flowing in device 703 is sourced to regulated power supply node 109 to maintain a desired voltage level on regulated power supply node 109. In various embodiments, the current flowing in device 703 may be increased or decreased relative to the current flowing in device 702 by varying a ratio of physical parameters, e.g., transistor width, between devices 702 and 703.

Devices 702 and 704 form another current mirror circuit configured to generate a current in device 703 that is a replica of the current flowing in device 702. As noted above, the current through device 704 may be scaled relative to the current flowing in device 702 by modifying physical parameters of device 704 relative to device 702. The voltage generated across resistor 705 on node 706 is used as a feedback signal to improve the stability of regulator circuit 600 and reduce the ripple on regulated power supply node 109 by providing faster feedback of changes in regulated power supply node 109 to control circuit 604.

Devices 701 and 702 form another current mirror circuit configured to generate a current flowing in device 701, i.e., sense current 612, that is a replica of the current flowing in device 702. In various embodiments, sense current 612 may be scaled down from the current being sourced to regulated power supply node 109 by varying a ratio of physical parameters, e.g., transistor width, between devices 702 and 701.

In various embodiments, devices 701-704 may be implemented as p-channel MOSFETs, FinFETs, GAAFETS, or any other suitable transconductance devices. Although devices 701-704 are depicted as being single devices, in other embodiments, any of devices 701-704 may be implemented using multiple devices coupled in parallel. Resistor 705 may be implemented using metal, polysilicon, diffusion, or any other suitable material available in a semiconductor manufacturing process.

Figure 8:
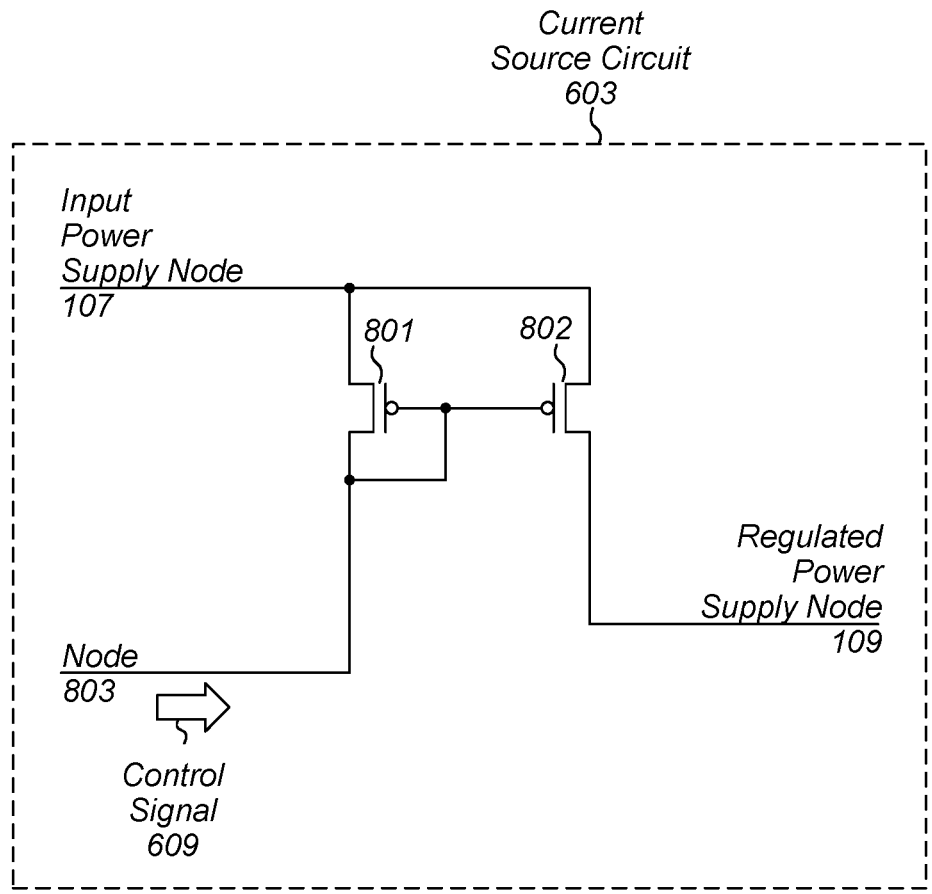
FIG. 8 is a block diagram of a different embodiment of a current source circuit for a voltage regulator circuit.

Turning to FIG. 8, a block diagram of an embodiment of current source circuit 603 is depicted. As illustrated, current source circuit 603 includes devices 801 and 802. Device 801 is coupled between input power supply node 107 and node 803 and is controlled by a voltage level of node 803. Device 802 is coupled between input power supply node 107 and regulated power supply node 109, and is also controlled by the voltage level of node 803.

Devices 801 and 802 form a current mirror circuit configured to generate a current in device 802 that is a replica of the current flowing in device 801 based on control signal 609. In various embodiments, the current flowing through device 802 into regulated power supply node 109 may be scaled up or down from the current flowing in device 801 by varying a ratio of physical parameters, e.g., transistor width, between devices 801 and 802.

In various embodiments, devices 801 and 802 may be implemented as p-channel MOSFETs, FinFETs, GAAFETS, or any other suitable transconductance device. Although devices 801 and 802 are depicted as being single devices, in other embodiments, any of devices 801 and 802 may be implemented using multiple devices coupled in parallel.

Figure 9:
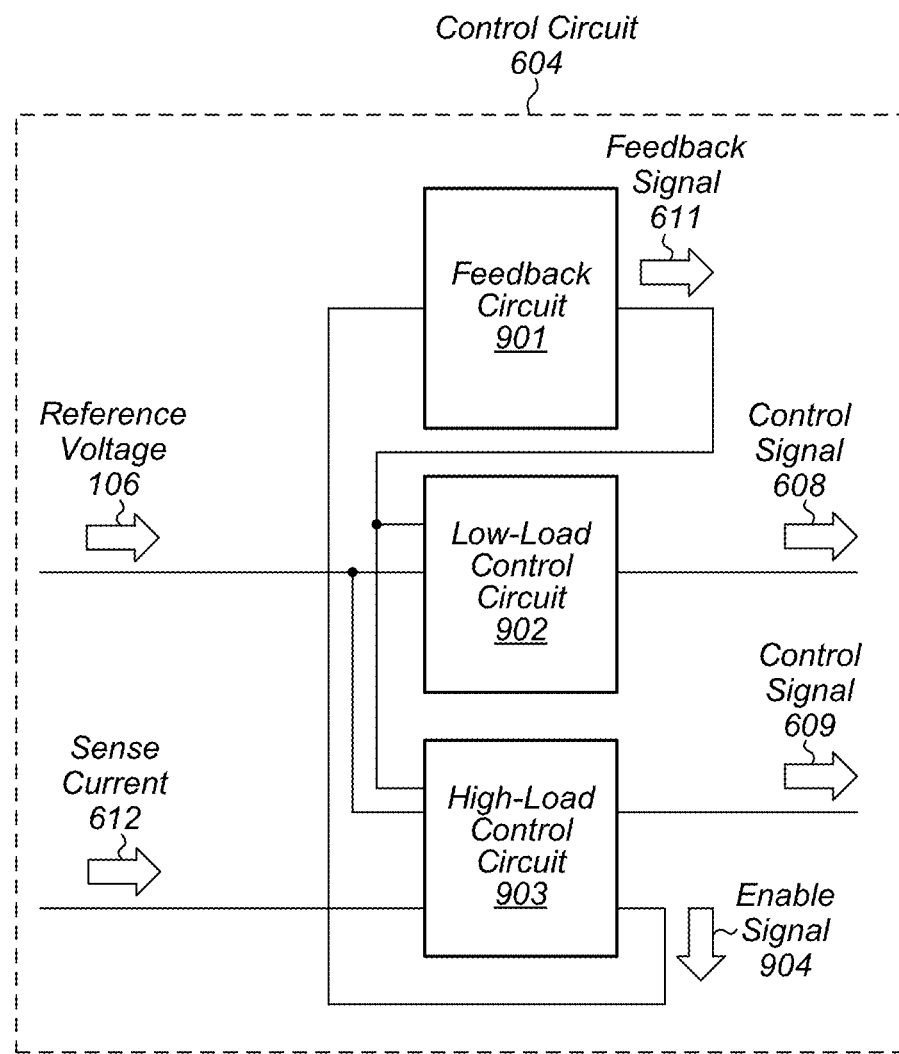
FIG. 9 is a block diagram of another embodiment of a control circuit included in a voltage regulator circuit.

A block diagram of an embodiment of control circuit 604 is depicted in FIG. 9. As illustrated, control circuit 604 includes feedback circuit 901, low-load control circuit 902, and high-load control circuit 903.

Feedback circuit 901 is configured to generate feedback signal 611 using enable signal 904. In various embodiments, feedback circuit 901 is configured to modify a value of feedback signal 611 based on a value of enable signal 904. As described below, feedback circuit 901 may be implemented using a resistive voltage divider circuit or other suitable circuit configured to generate at least two analog voltage levels.

Low-load control circuit 902 is configured to generate control signal 608 using reference voltage 106 and feedback signal 611. As described below, to generate control signal 608, low-load control circuit 902 may be configured to perform a comparison of reference voltage 106 and feedback signal 611, and adjust a value of control signal 608 based on a result of the comparison.

High-load control circuit 903 is configured to generate enable signal 904 using sense current 612. As described below, high-load control circuit 903 may be configured to activate enable signal 904 based on a combination of sense current 612 and a reference current, and to deactivate enable signal 904 based on comparison of feedback signal 611 and reference voltage 610. Since enable signal 904 changes a value of feedback signal 611, the feedback between the two circuit allows high-load control circuit 903 to function, in various embodiments, as a hysteretic comparator that is used to signal the switching from high-current mode back to low-current mode. High-load control circuit 903 is also configured to activate control signal 609 in response to an activation of enable signal 904.

Figure 10:
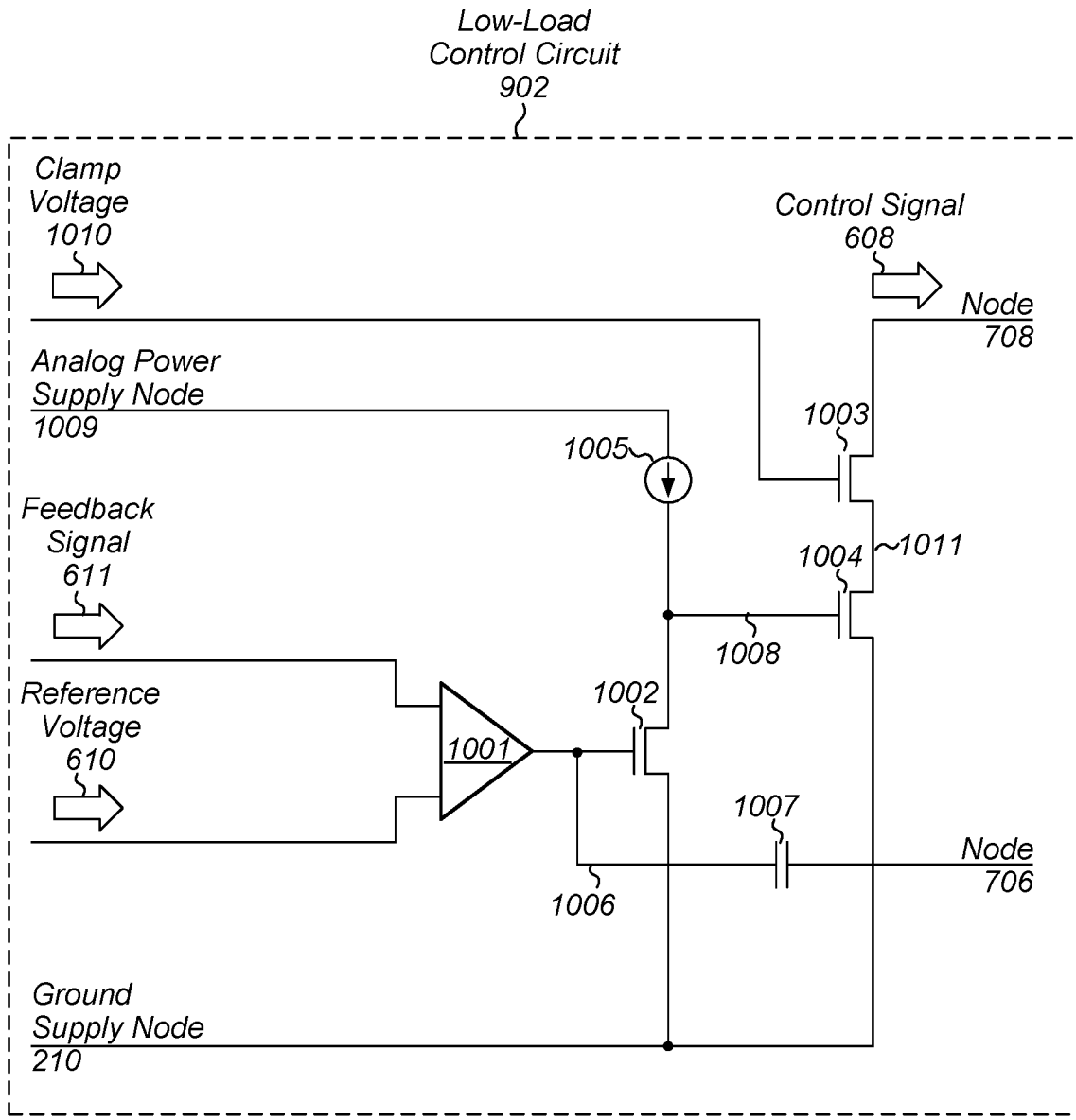
FIG. 10 is a block diagram of an embodiment of a low-load control circuit included in a voltage regulator circuit.

Turning to FIG. 10, a block diagram of an embodiment of low-load control circuit 902 is depicted. As illustrated, low-load control circuit 902 includes comparator circuit 1001, devices 1002-1004, current source 1005, and capacitor 1007.

Comparator circuit 1001 is configured to generate a voltage level on node 1006 using feedback signal 611 and reference voltage 610. In various embodiments, comparator circuit 1001 is configured to generate the voltage level on node 1006 such that the voltage level is proportional to a difference between feedback signal 611 and reference voltage 610. It is noted that node 1006 is coupled to node 706 via capacitor 1007 to increase the response time of low-load control circuit 902 to transients on regulated power supply node 109. In various embodiments, comparator circuit 1001 may be implemented using a differential amplifier circuit or any other suitable circuit configured to generate an output signal based on a comparison of two or more input signals.

Current source 1005 is coupled between analog power supply node 1009 and node 1008 and is configured to source a current to node 1008. In various embodiments, a noise level of analog power supply node 1009 may be less than a noise level of other power supply nodes used by voltage regulator circuit 600.

Device 1002 is coupled between node 1008 and ground supply node 210. In various embodiments, device 1002 is configured to adjust a resistance between node 1008 and ground supply node 210 based on a voltage level of node 1006. For example, the higher the voltage level on node 1006, the lower the resistance between node 1008 and ground supply node 210. The combination of the current sourced by current source 1005 and the current flowing through device 1002 into ground supply node 210 determines a voltage level of node 1008, which, in turn, adjusts the conductance of device 1004.

Device 1003 is coupled between node 708 and node 1011, and is controlled by clamp voltage 1010. By setting clamp voltage 1010 to a particular value, a maximum value of control signal 608 is determined, which sets a limit on the maximum current that can be sourced by current source circuit 602 to regulated power supply node 109.

Device 1004 is coupled between node 1011 and ground supply node 210. As described above, the voltage level of node 1008 controls the conductance of device 1004, which allows a current to flow from node 708 through devices 1003 and 1004 into ground supply node 210 to generate control signal 608. It is noted that in some embodiments, control signal 608 is a current that can be mirrored or replicated by current source circuit 602 while, in other embodiments, control signal 608 may refer to a voltage level of node 708 generated by the current flowing through devices 1003 and 1004 into ground.

In various embodiments, devices 1002-1004 may be implemented as n-channel MOSFETs, FinFETS, GAAFETs, or any other suitable transconductance devices. Capacitor 1007 may be implemented using a MOM structure, a MIM structure, or any other suitable capacitor structure available on a semiconductor manufacturing process.

Figure 11:
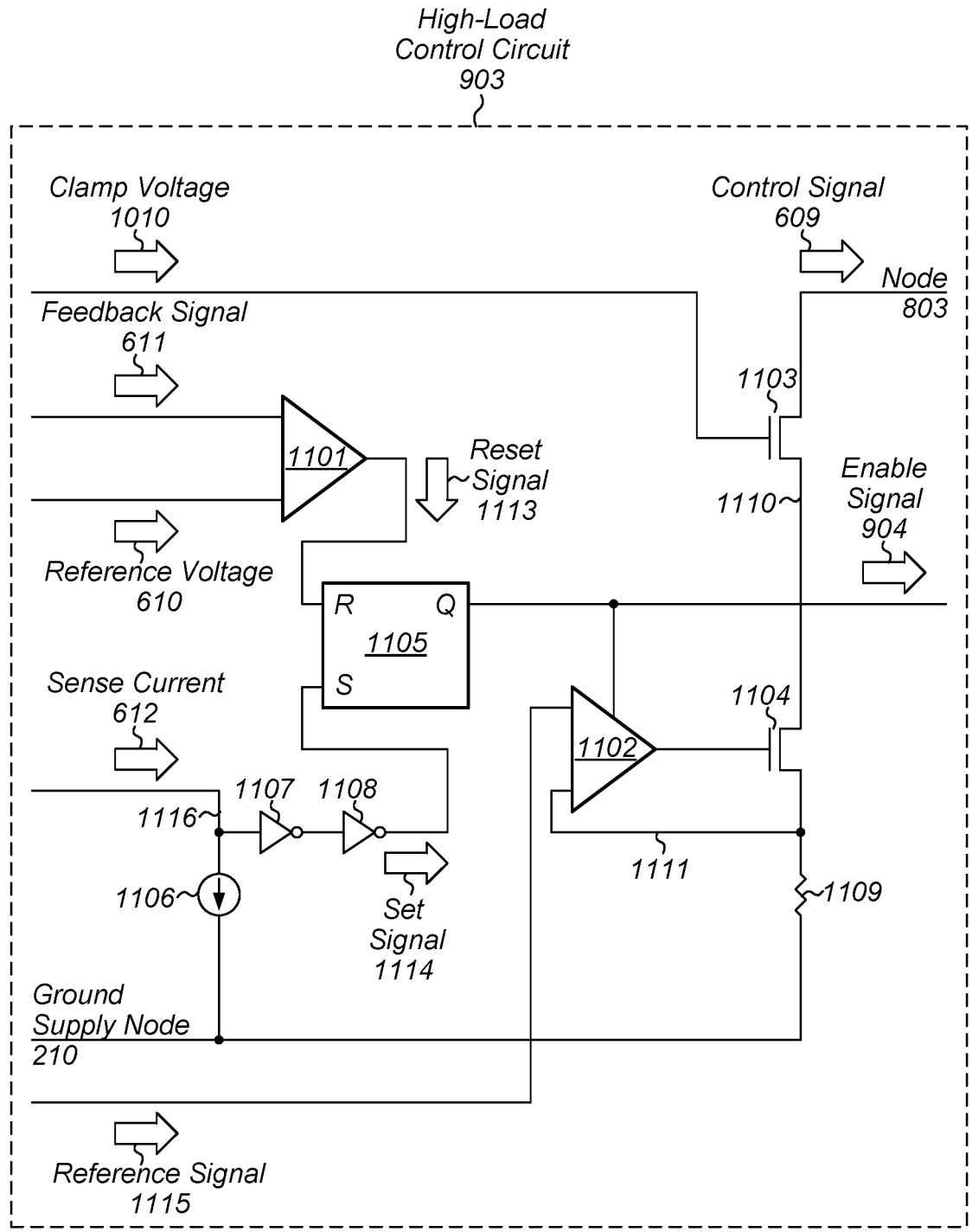
FIG. 11 is a block diagram of an embodiment of a high-current control circuit included in a voltage regulator circuit.

A block diagram of an embodiment of high-load control circuit 903 is depicted in FIG. 11. As illustrated, high-load control circuit 903 includes comparator circuits 1101 and 1102, devices 1103 and 1104, latch circuit 1105, current source 1106, inverter circuits 1107 and 1108, and resistor 1109.

Comparator circuit 1101 is configured to generate reset signal 1113 using feedback signal 611 and reference voltage 610. In various embodiments, to generate reset signal 1113, comparator circuit 1101 is further configured to activate reset signal 1113 in response to a determination that feedback signal 611 is greater than reference voltage 610. Comparator circuit 1101 may, in different embodiments, be implemented using a Schmitt trigger circuit, or any other suitable comparator circuit.

Current source 1106 is coupled between node 1116 and ground supply node 210. Sense current 612 is combined with a current generated by current source 1106 on node 1116. A resultant voltage level of node 1116 is buffered by inverter circuits 1107 and 1108 to generate set signal 1114. For example, when sense current 612 is greater than the current sunk from node 1116 by current source 1106, the voltage level of node 1116 increases and set signal 1114 is activated. In some embodiments, the current sunk by current source 1106 is set to determine when current source circuit 603 will become active and source additional current to regulated power supply node 109. In various embodiments, inverter circuits 1107 and 1108 may be implemented as CMOS inverters or any other suitable inverting amplifier circuit.

Latch circuit 1105 is configured to generate enable signal 904 using set signal 1114 and reset signal 1113. In various embodiments, latch circuit 1105 is further configured to activate enable signal 904 in response to an activation of set signal 1114. Latch circuit 1105 is also configured to deactivate enable signal 904 in response to an activation of reset signal 1113. In some embodiments, latch circuit 1105 may be implemented as a set-reset (SR) latch circuit or any other suitable latch circuit.

Device 1103 is coupled between node 803 and node 1110, and is controlled by clamp voltage 1010. By setting clamp voltage 1010 to a particular value, a maximum value of control signal 609 is determined, which protects devices coupled to regulated power supply node 109 from being exposed to the full voltage level of input power supply node 107.

Device 1104 is coupled between node 1110 and node 1111, which is, in turn, coupled to ground supply node 210 via resistor 1109. Device 1104 and comparator circuit 1102 are configured, in response to an activation of enable signal 904, to convert reference signal 1115 to a current flowing in device 1104, through resistor 1109, into ground supply node 210. In various embodiments, device 1104 and comparator circuit 1102 collectively function as a voltage-to-current converter circuit. Comparator circuit 1102 may be implemented using a differential amplifier circuit or any other suitable comparator circuit.

The current flowing through devices 1103 and 1104 generate control signal 609 on node 803. It is noted that in some embodiments, control signal 609 is a current that can be mirrored or replicated by current source circuit 603 while, in other embodiments, control signal 609 may refer to a voltage level of node 803 generated by the current flowing through devices 1103 and 1104 into ground supply node 210.

In various embodiments, devices 1103 and 1104 may be implemented as n-channel MOSFETs, FinFETS, GAAFETs, or any other suitable transconductance devices. Resistor 1109 may be implemented using metal, polysilicon, diffusion, or any other suitable material available in a semiconductor manufacturing process.

Figure 12:
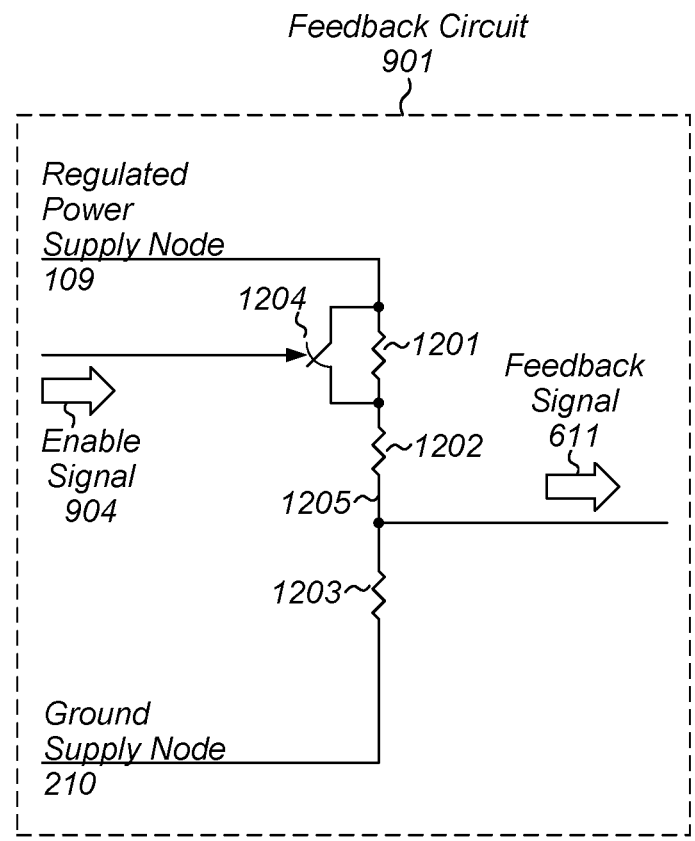
FIG. 12 is a block diagram of a feedback circuit included in a voltage regulator circuit.

Turning to FIG. 12, a block diagram of an embodiment of feedback circuit 901 is depicted. As illustrated, feedback circuit 901 includes resistors 1201-1203 and switch 1204. It is noted that, in various embodiments, feedback circuit 901 functions as an adjustable resistive voltage divider circuit.

Resistors 1201 and 1202 are coupled between regulated power supply node 109 and node 1205, while resistor 1203 is coupled between node 1205 and ground supply node 210. Switch 1204 is coupled, in parallel, with resistor 1201 and is controlled by enable signal 904.

When enable signal 904 is inactive, switch 1204 is open, and a voltage level of feedback signal 611 is based on a ratio of a value of resistor 1203 to a sum of the values of resistors 1201-1203. In response to an activation of enable signal 904, switch 1204 is configured to close, coupling resistor 1202 between regulated power supply node 109 and node 1205. In such cases, the voltage level of feedback signal 611 is based on a ratio of the value of resistor 1203 to a sum of the values of resistors 1202 and 1203.

In various embodiments, switch 1204 may be implemented as a pass gate circuit that includes multiple n-channel and p-channel MOSFETs, FinFETs, GAAFETS, or any other suitable transconductance devices. Resistors 1201-1203 may be implemented using metal, polysilicon, diffusion, or any other suitable material available in a semiconductor manufacturing process.

As described above, regulator circuits, such as regulator circuit 100, may be implemented using a library of sub-circuits that have been implemented and characterized. The library provides a scalable regulator circuit design that can be adjusted to fit various electrical and physical design constraints by using different sub-circuits or different numbers of sub-circuits in the library. The physical design, consisting of mask design information, of such a regulator circuit can be generated using the physical designs of the sub-circuits in the library. To make such an implementation possible, the physical designs of the pass circuits and the control circuit are generated such that the various sub-circuits can be abutted to one another to make the necessary connections.

Figure 13:
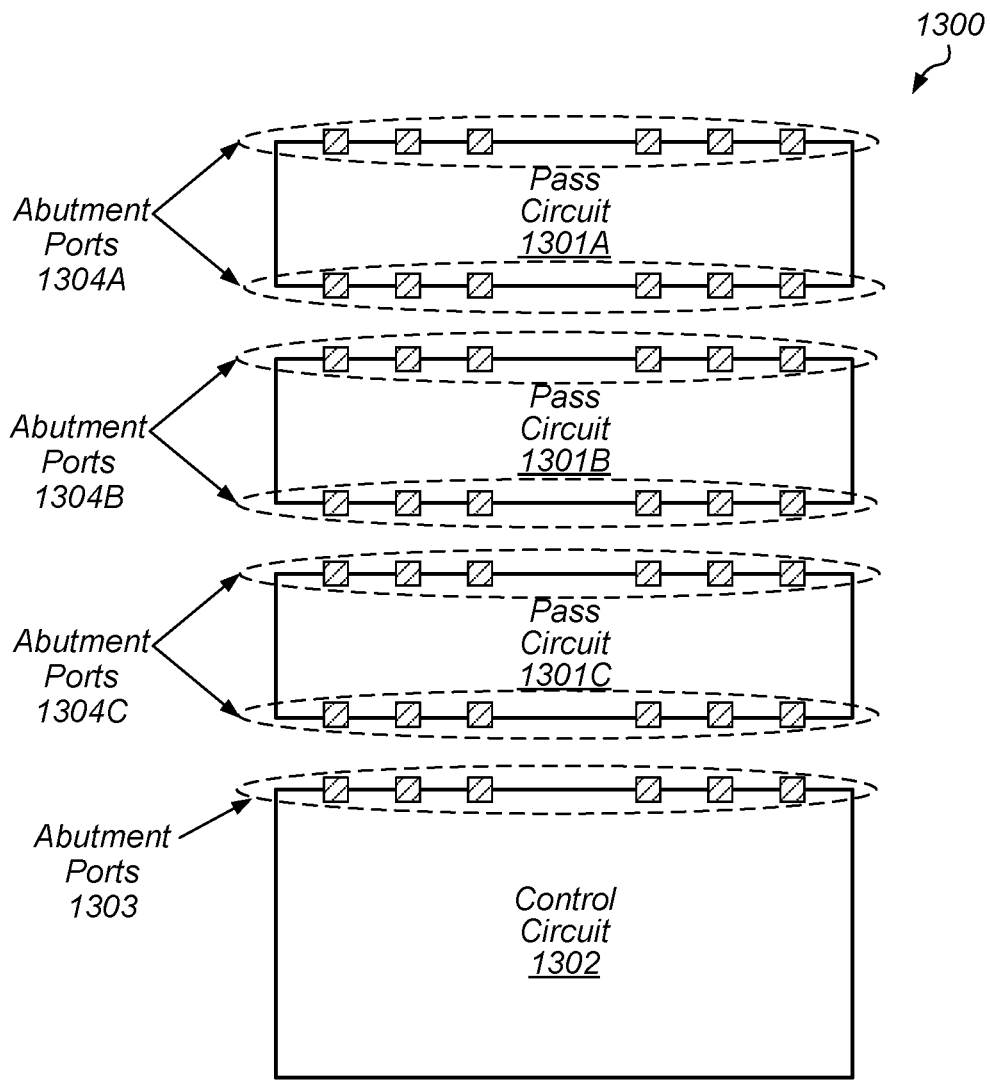
FIG. 13 is a block diagram of an arrangement of pass circuits and a control circuit included in a voltage regulator circuit.

A block diagram depicting an embodiment of a physical placement of sub-circuits from a library to form a regulator circuit is depicted in FIG. 13. As illustrated, regulator circuit 1300 includes pass circuits 1301A-1301C and control circuit 1302.

Control circuit 1302 includes abutment ports 1303 located along one edge of the physical design. In various embodiments, control circuit 1302 may correspond to control circuit 101 and abutment ports 1303 may be terminals into and out of control circuit 101 for control signals 103, sense current 104, and the like. It is noted that the placement of abutment ports 1303 is merely an example and that, in other embodiments, different numbers of abutment ports and different placement of abutment ports are possible and contemplated.

Pass circuit 1301A includes abutment ports 1304A, and pass circuit 1301B includes abutment ports 1304B. In a similar fashion, pass circuit 1301C includes abutment ports 1304C. In various embodiments, pass circuits 1301A-1301C may correspond to pass circuits 102A-102C as depicted in FIG. 1.

In some cases, an abutment port from one side of a given one of pass circuits 1301A-1301C may be coupled to a corresponding abutment port on the other side of the given one of pass circuits 1301A-1301C. In other cases, such as for configuration signal 214, multiple wiring tracks may be present in each of pass circuits 1301A-1301C, and the connection for a given bit of configuration signal 214 to a corresponding one of pass circuits 1301A-1301C may be made using one or more vias, additional metal structures, and the like. It is noted that the placement of abutment ports 1304A-1304C is merely an example and that, in other embodiments, different numbers of abutment ports and different placement of abutment ports are possible and contemplated.

When control circuit 1302 and pass circuits 1301A-1301C are placed next to each other, the abutment ports overlap and complete the wiring between control circuit 1302 and pass circuits 1301A-1301C. It is noted that, although only a single type of pass circuit is depicted in the embodiment of FIG. 13, in other embodiments, alternative implementations of pass circuits, as well as control circuit 1302, may be available in the library for use to implement a regulator circuit with a different footprint and/or electrical characteristics.

Figure 14:
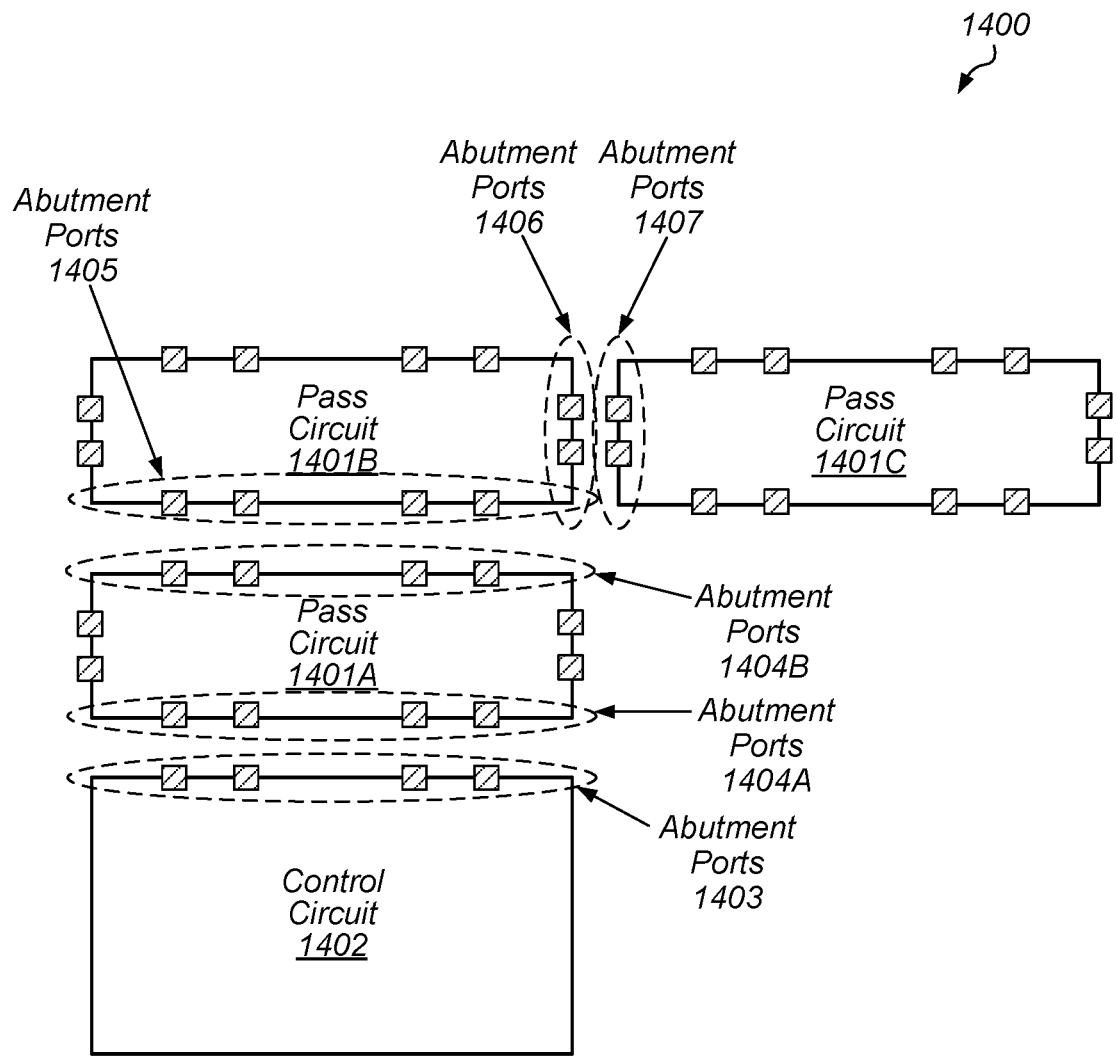
FIG. 14 is a block diagram of another arrangement of pass circuits and a control circuit included in a voltage regulator circuit.

Turning to FIG. 14, another topology of a regulator circuit implemented with a sub-circuit library is depicted. As illustrated, regulator circuit 1400 includes pass circuits 1401A-1401C and control circuit 1402. In various embodiments, pass circuits 1401A-1401C may correspond to pass circuits 102A-C, and control circuit 1402 may correspond to control circuit 101.

Control circuit 1402 includes abutment ports 1403, which are used to couple control circuit 1402 to pass circuit 1401A along with abutment ports 1404A of pass circuit 1401A. Pass circuit 1401A is, in turn, coupled to pass circuit 1401B using abutment ports 1404B of pass circuit 1401A and abutment ports 1405 of pass circuit 1401B.

To allow for a different, in this case L-shaped topology, pass circuit 1401B includes routing that connects ones of abutment ports 1405 to corresponding ones of abutments ports 1406. Pass circuit 1401B is coupled to pass circuit 1401C using abutment ports 1406 of pass circuit 1401B and abutments ports 1407 of pass circuit 1401C. Although pass circuit 1401C is depicted as being coupled to one side of pass circuit 1401B, in other embodiments, another pass gate can be coupled to the other side of pass circuit 1401B. Moreover, abutment ports on the short sides of pass circuits 1401A may also be used to couple to additional pass circuits to further increase a maximum value for the total supply current that can be sourced to a regulated power supply node, such as regulated power supply node 109.

Many integrated circuits use an array of solder bumps or balls (referred to as a "ball array") to connect to a circuit board or substrate. Some balls may be used for input/output connections, while other balls may be used for power and ground connections to an integrated circuit. The balls within a ball array may be uniformly distributed creating a standard ball array, or the balls may be arranged with different spacings creating a staggered ball array. In both cases, multiple regulator circuits, such as regulator circuit 100, may be placed underneath a group of balls in the ball array that are connected to a power supply node, e.g., input power supply node 107, and share the power supply connections.

Figure 15A:
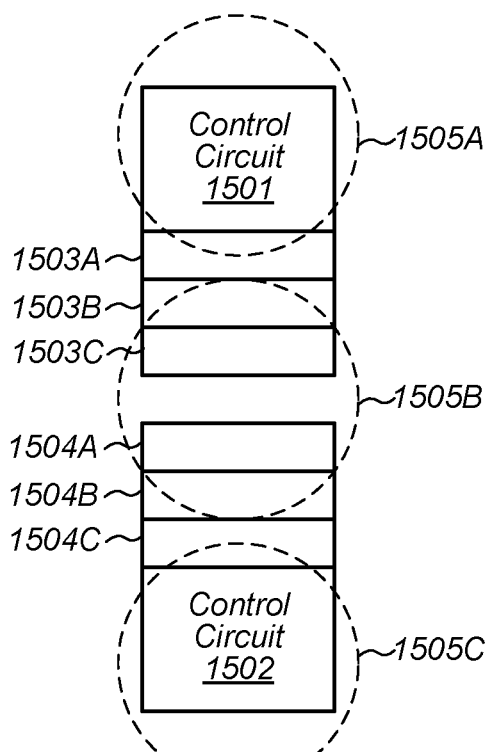
FIG. 15A is a block diagram of an arrangement of solder balls for multiple voltage regulator circuits.

A block diagram of two regulator circuits of the same size sharing ball connections is depicted in FIG. 15A. As illustrated, a first regulator circuit includes control circuit 1501 and pass circuits 1503A-1503C, while a second regulator circuit includes control circuit 1502 and pass circuits 1504A-1504C. Both the first regulator circuit and the second regulator circuit share connections to balls 1505A-1505C. It is noted that both the first and second regulator circuits employ the same number of pass circuits, so their respective areas are the same allowing the area under balls 1505A-1505C to be evenly shared between the two regulator circuits.

It is noted that although the two regulator circuits are depicted as sharing the connections for three balls in a ball array, in other embodiments, two or more regulator circuits may share the connections for any suitable number of balls depending on the spacing between balls within the ball array and the respective sizes of the regulator circuits.

Figure 15B:
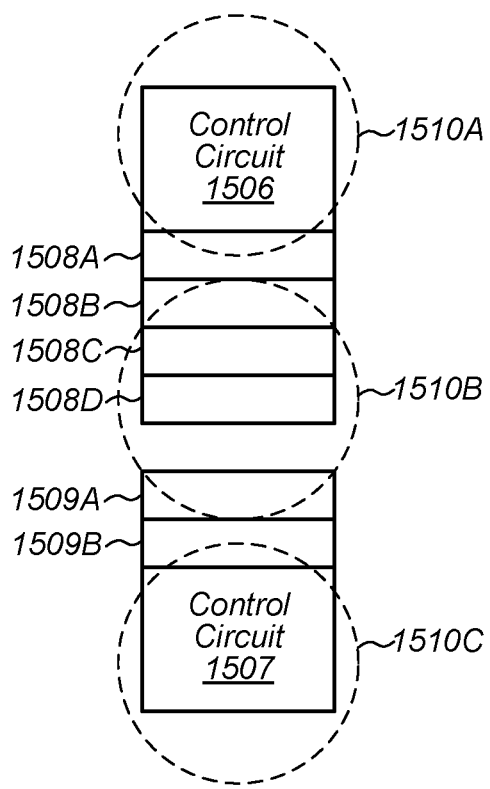
FIG. 15B is block diagram of a different arrangement of solder balls for multiple voltage regulator circuits.

Turning to FIG. 15B, a block diagram of two regulator circuits of different sizes sharing a group of balls is depicted. As illustrated, a first regulator circuit includes control circuit 1506 and pass circuits 1508A-1508D, while a second regulator circuit includes control circuit 1507 and pass circuits 1509A-1509B. Both the first regulator circuit and the second regulator circuit share connections to balls 1510A-1510C.

In various embodiments, the difference in the number of pass circuits included in the first and the second regulator circuits may be based on differences in the desired electrical performance of the two regulator circuits. For example, the first regulator circuit may need to provide a higher supply current necessitating more pass circuits, while the second regulator circuit may have a lower supply current rating allowing for less pass circuits. By pairing larger regulator circuits with smaller regulator circuits, the area underneath balls 1510A-1510C can be efficiently used and the area unused by the second regulator circuit can be employed by the first regulator circuit.

It is noted that although the two regulator circuits are depicted as sharing the connections for three balls in a ball array, in other embodiments, two or more regulator circuits may share the connections for any suitable number of balls depending on the spacing between balls within the ball array and the respective sizes of the regulator circuits.

To summarize, various embodiments of a scalable regulator circuit are disclosed. Broadly speaking, a regulator circuit includes a control circuit and a plurality of pass circuits coupled to a regulated power supply node. The plurality of pass circuits are configured to source corresponding supply currents of a plurality of supply currents to the regulated power supply node using a plurality of control signals and a voltage level of an input power supply node. The plurality of pass circuits are further configured to generate a sense current indicative of a total supply current being sourced to the regulated power supply node. The control circuit is configured to generate the plurality of control signals using a voltage level of the regulated power supply node, a reference voltage, and the sense current.

In some embodiments, the plurality of control signals includes a gate control signal, and the plurality of pass circuits are further configured to source the corresponding supply currents to the regulated power supply node using the gate control signal. The control circuit is also configured to generate a feedback signal using the voltage level of the regulated power supply node, perform a comparison of the feedback signal to the reference voltage, and generate the gate control signal using a result of the comparison.

In other embodiments, to generate the gate control signal, the control circuit is further configured to sink a control current from a control node. The value of the control current may be based on a result of the comparison and the sense current.

In various embodiments, the control circuit is also configured to adjust a value of the control current based on a rate of change of the sense current. In some embodiments, to generate the sense current, the plurality of pass circuits are further configured to combine respective partial sense currents generated by the plurality of pass circuits.

In other embodiments, the control circuit is further configured to sink an over-voltage current from the regulated power supply node in response to a determination that a voltage level of the regulated power supply node has exceeded a threshold value.

Figure 16:
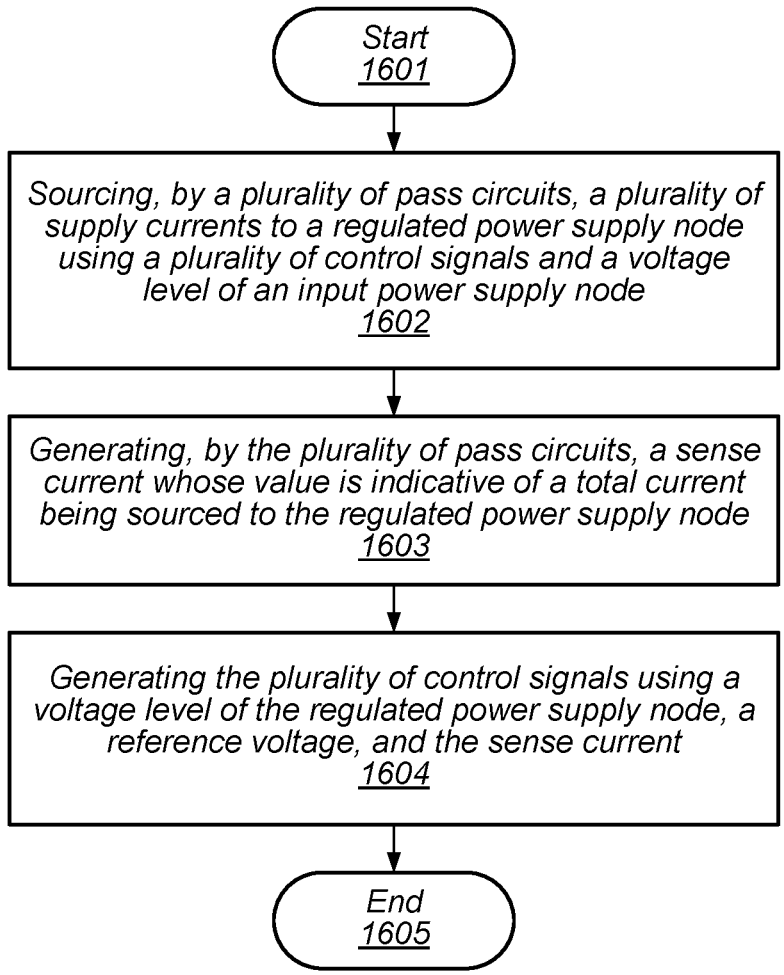
FIG. 16 is a flow diagram of an embodiment of a method for operating a voltage regulator circuit.

Turning to FIG. 16, a flow diagram depicting an embodiment of a method for operating a regulator circuit is illustrated. The method, which begins at block 1601, may be applied to various regulator circuits including regulator circuit 100 as depicted in FIG. 1.

The method includes sourcing, by a plurality of pass circuits, a plurality of supply currents to a regulated power supply node using a plurality of control signals and a voltage level of an input power supply node (block 1602). In various embodiments, a number of pass circuits included in the plurality of pass circuits is based on a target load current for the regulated power supply node which, as described below, may be determined during the design process of an integrated circuit.

The method also includes generating, by the plurality of pass circuits, a sense current whose value is indicative of a total current being sourced to the regulated power supply node (block 1603). In some embodiments, generating the sense current includes combining respective partial sense currents generated by the plurality of pass circuits.

The method further includes generating the plurality of control signals using a voltage level of the regulated power supply node, a reference voltage, and the sense current (block 1604). In various embodiments, generating the plurality of control signals may include generating a feedback signal using the voltage level of the regulated power supply node, and performing a comparison of the feedback signal to a reference voltage.

In some embodiments, generating the control signals may include sinking a control current from a control signal node. In some cases, the value of the control current is based on a result of the comparison of the feedback signal and the reference voltage, as well as the sense current. In other embodiments, the method may also include adjusting a value of the control current based on a rate of change of the sense current.

In some embodiments, the method may further include setting a limit for a combined value of the plurality of source currents during a startup period by enabling the plurality of pass circuits to generate the respective partial sense currents, and increasing, after a given time period has elapsed, the limit for the combined value of the plurality of source currents by disabling the generation of at least one of the respective partial sense currents. In other embodiments, the method may also include sinking an over-voltage current from the regulated power supply node in response to determining that a voltage level of the regulated power supply node has exceeded a threshold value. The method concludes in block 1605.

Figure 17:
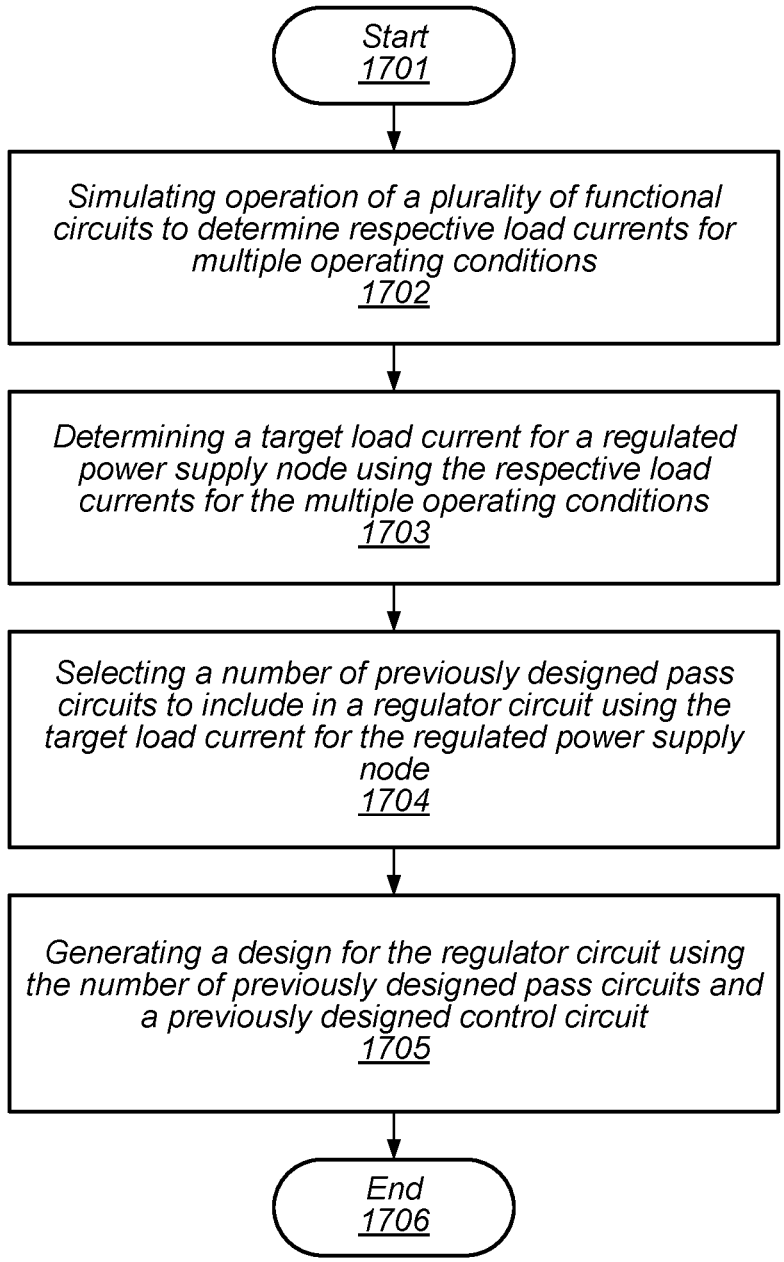
FIG. 17 is a flow diagram depicting an embodiment of a method for determining a number of pass circuits to include in a voltage regulator circuit.

As described above, the number of pass circuits included in regulator circuit 100 is based on a target load current for regulated power supply node 109. Various methods may be used to determine such a target load current. A flow diagram depicting an embodiment of a method for selecting the number of pass circuits to use in a regulator circuit is illustrated in FIG. 17. The method, which begins in block 1701 may be applied to various regulator circuits, such as regulator circuit 100.

The method includes simulating operation of a plurality of functional circuits to determine respective load currents for multiple operating conditions (block 1702). The functional circuits may, in various embodiments, include digital circuits, analog/mixed-signal circuits, radio-frequency circuits, and the like. Depending on the type of circuits being simulated, different simulation techniques may be employed. For example, a simulation program with integrated circuit emphasis (SPICE) may be used to simulate the operation of analog/mixed-signal and radio-frequency circuits. In various embodiments, the multiple operating conditions may include different combinations of power supply voltage level, temperature, and electrical characteristics of the circuits (referred to as a "process corner").

The method also includes determining a target load current for a regulated power supply node using the respective load currents for the multiple operating conditions (block 1703). In various embodiments, determining the target load current may include selecting a maximum value for each of the respective load currents and adding the maximum values together. In some cases, additional margin may be added to the target load current to account for situations and conditions that are not easily simulated.

The method further includes selecting a number of previously designed pass circuits to include in a regulator circuit using the target load current for the regulated power supply node (block 1704). In various embodiments, a given pass circuit is designed to provide a maximum output current for a given set of operating conditions. Using the output current rating for the pass circuits, a number of pass circuits is selected that can provide the target load current when operated in parallel. In cases where the target load current can be provided by a non-integer number of pass circuits, a next high integer number of pass circuits may be selected.

The method also includes generating a design for the regulator circuit using the number of previously designed pass circuits and a previously designed control circuit (block 1705). Generating the design may, in some cases, include tiling or abutting the mask designs for the pass circuits and the control circuit. By using previously designed sub-assemblies in this fashion, the time required to design or modify a regulator circuit can be reduced. The method concludes in block 1706.

Figure 18:
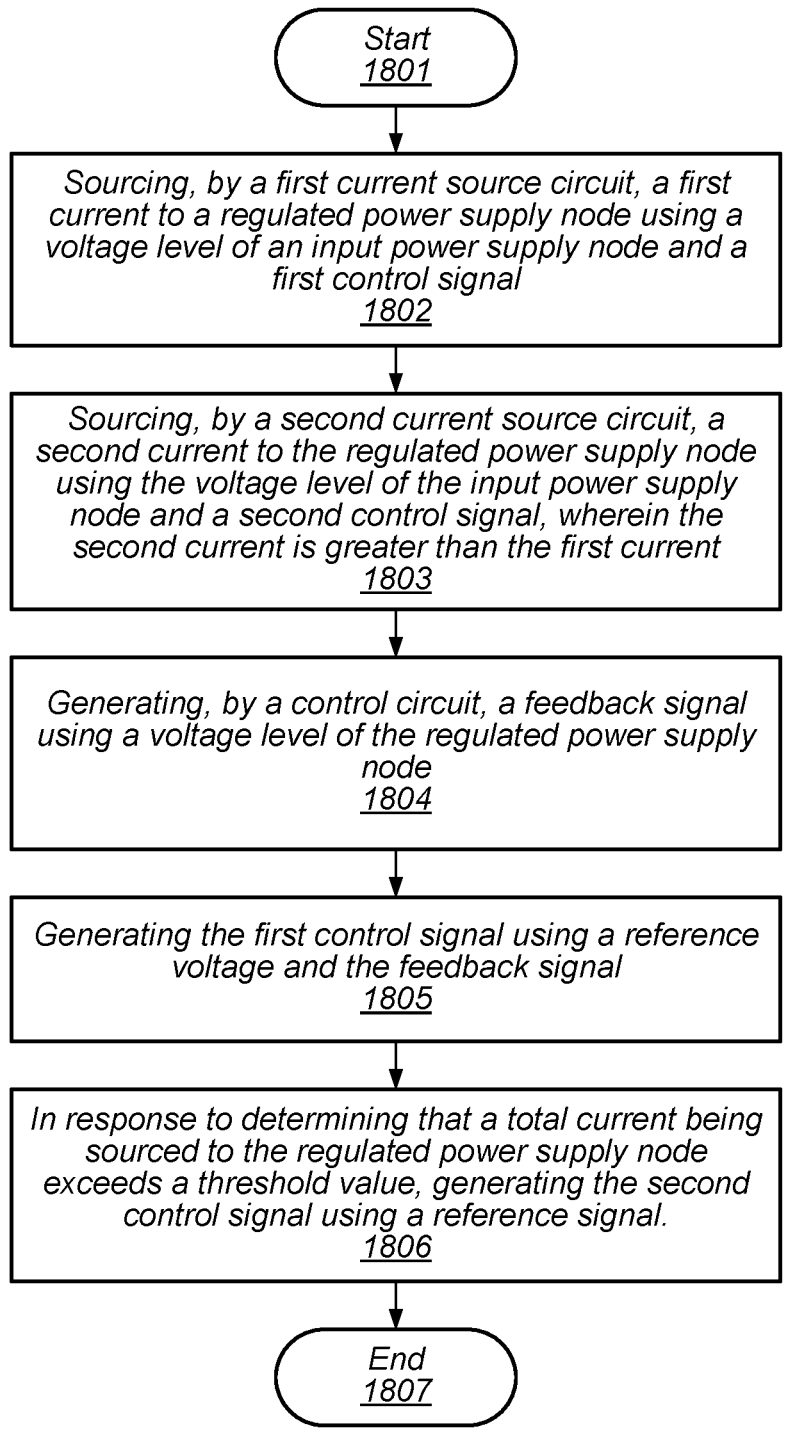
FIG. 18 is a flow diagram depicting an embodiment of a method for operating a voltage regulator circuit using a hysteretic comparator circuit.

Turning to FIG. 18, a flow diagram depicting an embodiment of a method for operating a voltage regulator circuit is illustrated. The method, which may be applied to various voltage regulator circuits, e.g., voltage regulator circuit 600, begins in block 1801.

The method includes sourcing, by a first current source circuit, a first current to a regulated power supply node using a voltage level of an input power supply node and a first control signal (block 1802).

The method further includes sourcing, by a second current source circuit, a second current to the regulated power supply node using the voltage level of the input power supply node and a second control signal (block 1803). In various embodiments, the second current is greater than the first current.

The method also includes generating, by a control circuit, a feedback signal using a voltage level of the regulated power supply node (block 1804). In various embodiments, the method further includes modifying a value of the feedback signal in response to determining that the total current being sourced to the regulated power supply nodes exceeds a threshold value. In some embodiments, modifying the value of the feedback signal includes adjusting a resistance value of a resistive voltage divider circuit.

The method further includes generating the first control signal using a reference voltage and the feedback signal (block 1805). In various embodiments, generating the first control signal includes performing a comparison of the reference voltage to the feedback signal, and generating the first control signal using a result of the comparison.

The method also includes, in response to determining that a total current being sourced to the regulated power supply node exceeds the threshold value, generating the second control signal using a reference signal (block 1806). In some embodiments, generating the second control signal includes converting a voltage level of a reference signal to a control current. In such cases, sourcing the second current to the regulated power supply node includes mirroring the control current to generate the second current. The method concludes in block 1807.

Figure 19:
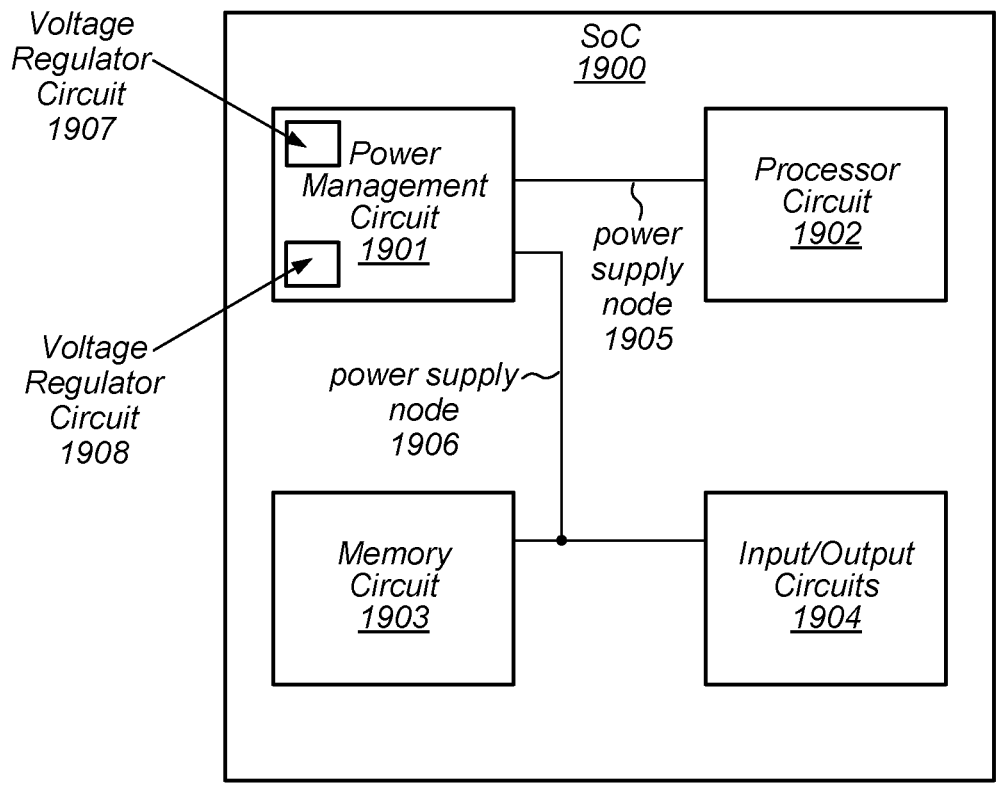
FIG. 19 is a block diagram of one embodiment of a system-on-a-chip that includes a power management circuit.

A block diagram of a system-on-a-chip (SoC) is illustrated in FIG. 19. In the illustrated embodiment, SoC 1900 includes power management circuit 1901, processor circuit 1902, input/output circuits 1904, and memory circuit 1903, each of which is coupled to power supply node 1905. In various embodiments, SoC 1900 may be configured for use in a desktop computer, server, or in a mobile computing application such as, e.g., a tablet, laptop computer, or wearable computing device.

Power management circuit 1901 includes voltage regulator circuits 1907 and 1908. Voltage regulator circuit 1907 is configured to generate a regulated voltage level on power supply node 1905 in order to provide power to processor circuit 1902. Voltage regulator circuit 1908 is configured to generate a regulated voltage level on power supply node 1906 in order to provide power to input/output circuits 1904 and memory circuit 1903. In various embodiments, voltage regulator circuit 1907 may include a particular number of pass circuits (e.g., pass circuits 102A-102C), while voltage regulator circuit 1908 may include a different number of pass circuits. Although power management circuit 1901 is depicted as including two regulator circuits, in other embodiments, any suitable number of regulator circuits may be included in power management circuit 1901, each configured to generate a regulated voltage level on a respective one of multiple internal power supply signals included in SoC 1900.

Processor circuit 1902 may, in various embodiments, be representative of a general-purpose processor that performs computational operations. For example, processor circuit 1902 may be a central processing unit (CPU) such as a microprocessor, a microcontroller, an application-specific integrated circuit (ASIC), or a field-programmable gate array (FPGA).

Memory circuit 1903 may, in various embodiments, include any suitable type of memory such as a Dynamic Random-Access Memory (DRAM), a Static Random-Access Memory (SRAM), a Read-Only Memory (ROM), an Electrically Erasable Programmable Read-only Memory (EEPROM), or a non-volatile memory, for example. It is noted that although a single memory circuit is illustrated in FIG. 19, in other embodiments, any suitable number of memory circuits may be employed.

Input/output circuits 1904 may be configured to coordinate data transfer between SoC 1900 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1904 may be configured to implement a version of Universal Serial Bus (USB) protocol or IEEE 1394 (Firewire®) protocol.

Input/output circuits 1904 may also be configured to coordinate data transfer between SoC 1900 and one or more devices (e.g., other computing systems or integrated circuits) coupled to SoC 1900 via a network. In one embodiment, input/output circuits 1904 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 1904 may be configured to implement multiple discrete network interface ports.

Figure 20:
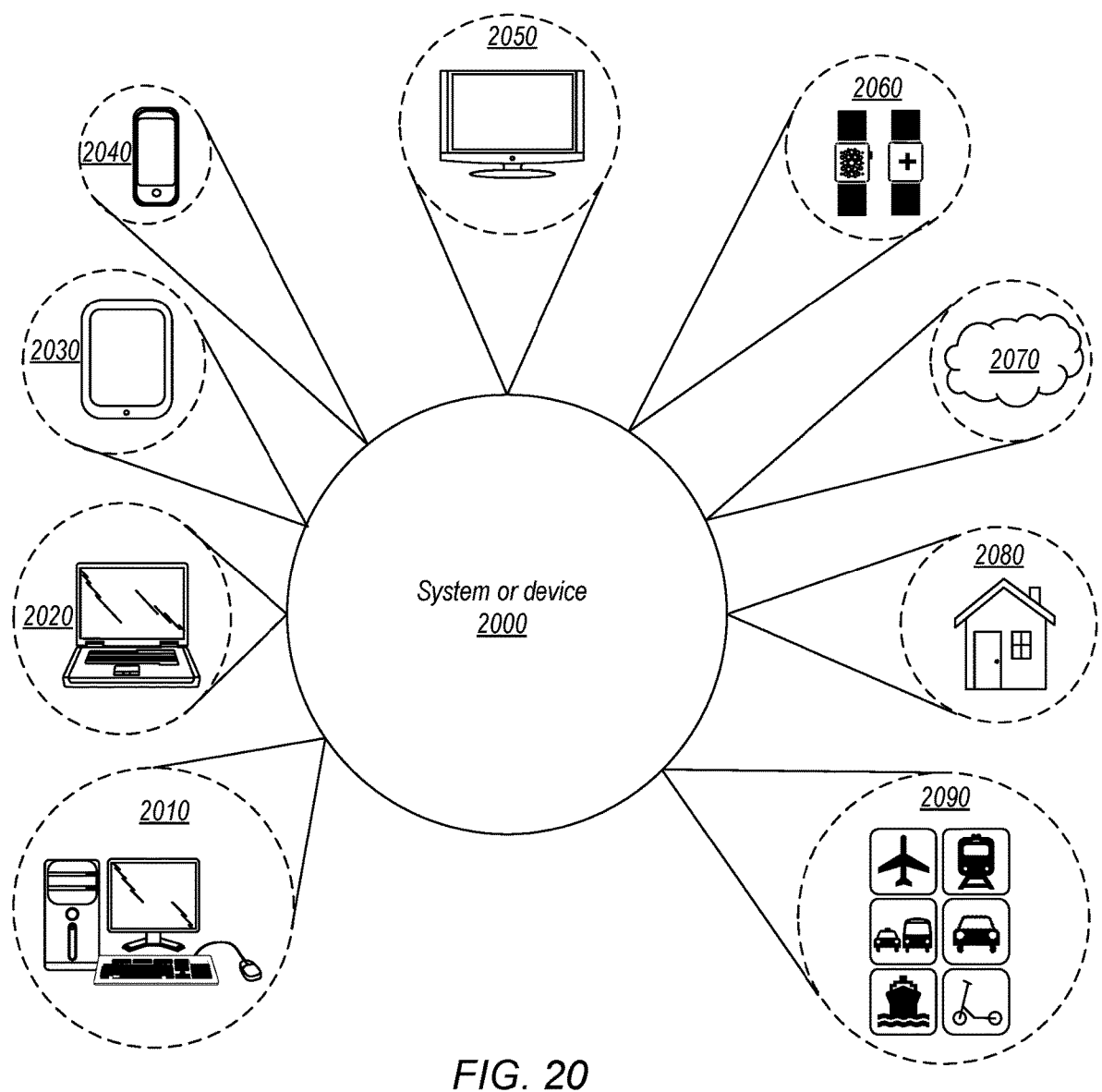
FIG. 20 is a block diagram of various embodiments of computer systems that may include power converter circuits.

Turning now to FIG. 20, various types of systems that may include any of the circuits, devices, or systems discussed above are illustrated. System or device 2000, which may incorporate or otherwise utilize one or more of the techniques described herein, may be utilized in a wide range of areas. For example, system or device 2000 may be utilized as part of the hardware of systems such as a desktop computer 2010, laptop computer 2020, tablet computer 2030, cellular or mobile phone 2040, or television 2050 (or set-top box coupled to a television).

Similarly, disclosed elements may be utilized in a wearable device 2060, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 2000 may also be used in various other contexts. For example, system or device 2000 may be utilized in the context of a server computer system, such as a dedicated server or on shared hardware that implements a cloud-based service 2070. Still further, system or device 2000 may be implemented in a wide range of specialized everyday devices, including devices 2080 commonly found in the home such as refrigerators, thermostats, security cameras, etc. The interconnection of such devices is often referred to as the "Internet of Things" (IoT). Elements may also be implemented in various modes of transportation. For example, system or device 2000 could be employed in the control systems, guidance systems, entertainment systems, etc. of various types of vehicles 2090.

The applications illustrated in FIG. 20 are merely exemplary and are not intended to limit the potential future applications of disclosed systems or devices. Other example applications include, without limitation: portable gaming devices, music players, data storage devices, unmanned aerial vehicles, etc.

Figure 21:
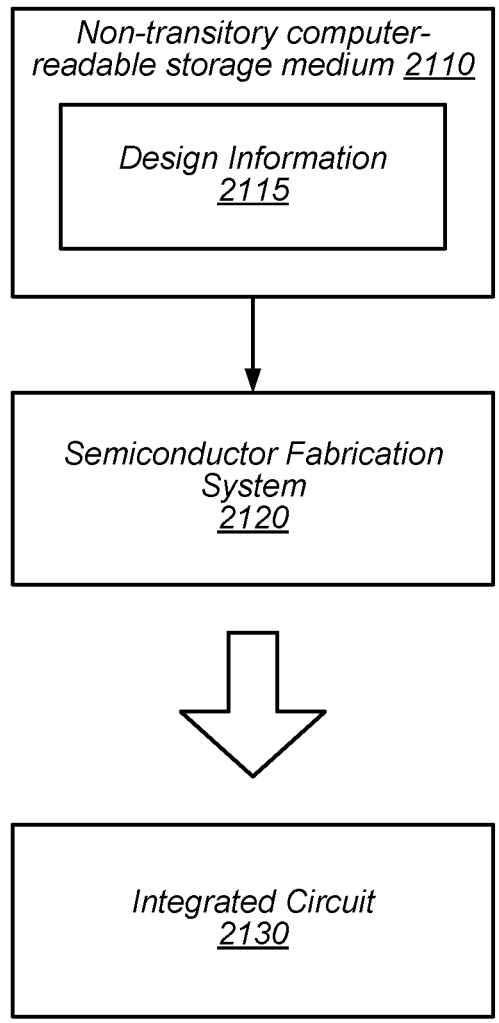
FIG. 21 illustrates an example of a non-transitory computer-readable storage medium that stores circuit design information.

FIG. 21 is a block diagram illustrating an example of a non-transitory computer-readable storage medium that stores circuit design information, according to some embodiments. In the illustrated embodiment, semiconductor fabrication system 2120 is configured to process design information 2115 stored on non-transitory computer-readable storage medium 2110 and fabricate integrated circuit 2130 based on design information 2115.

Non-transitory computer-readable storage medium 2110 may comprise any of various appropriate types of memory devices or storage devices. Non-transitory computer-readable storage medium 2110 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 2110 may include other types of non-transitory memory as well or combinations thereof. Non-transitory computer-readable storage medium 2110 may include two or more memory mediums, which may reside in different locations, e.g., in different computer systems that are connected over a network.

Design information 2115 may be specified using any of various appropriate computer languages, including hardware description languages such as, without limitation: VHDL, Verilog, SystemC, SystemVerilog, RHDL, M, MyHDL, etc. Design information 2115 may be usable by semiconductor fabrication system 2120 to fabricate at least a portion of integrated circuit 2130. The format of design information 2115 may be recognized by at least one semiconductor fabrication system, such as semiconductor fabrication system 2120, for example. In some embodiments, design information 2115 may include a netlist that specifies elements of a cell library, as well as their connectivity. One or more cell libraries used during logic synthesis of circuits included in integrated circuit 2130 may also be included in design information 2115. Such cell libraries may include information indicative of device or transistor level netlists, mask design data, characterization data, and the like, of cells included in the cell library.

Integrated circuit 2130 may, in various embodiments, include one or more custom macrocells, such as memories, analog or mixed-signal circuits, and the like. In such cases, design information 2115 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 2120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 2120 may also be configured to perform various testing of fabricated circuits for correct operation.

In various embodiments, integrated circuit 2130 is configured to operate according to a circuit design specified by design information 2115, which may include performing any of the functionality described herein. For example, integrated circuit 2130 may include any of various elements shown or described herein. Further, integrated circuit 2130 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. An apparatus, comprising:
   a plurality of pass circuits, wherein respective outputs of the plurality of pass circuits are coupled to a common regulated power supply node, wherein the plurality of pass circuits is configured to:
      source corresponding supply currents of a plurality of supply currents to the regulated power supply node using a plurality of control signals and a voltage level of an input power supply node; and
      generate a sense current indicative of a total supply current being sourced to the regulated power supply node; and
   a control circuit configured to generate the plurality of control signals using a voltage level of the regulated power supply node, a reference voltage, and the sense current.

2. The apparatus of claim 1, wherein the plurality of control signals includes a gate control signal, and wherein the plurality of pass circuits are further configured to source the corresponding supply currents to the regulated power supply node using the gate control signal, and wherein the control circuit is further configured to:
   generate a feedback signal using the voltage level of the regulated power supply node;
   perform a comparison of the feedback signal to the reference voltage; and
   generate the gate control signal using a result of the comparison.

3. The apparatus of claim 2, wherein to generate the gate control signal, the control circuit is further configured to sink a control current from a control node, wherein a value of the control current is based on the result of the comparison and the sense current.

4. The apparatus of claim 3, wherein the control circuit is further configured to adjust a value of the control current based on a rate of change of the sense current.

5. The apparatus of claim 1, wherein to generate the sense current, the plurality of pass circuits are further configured to combine respective partial sense currents generated by the plurality of pass circuits.

6. The apparatus of claim 1, wherein the control circuit is further configured to sink an over-voltage current from the regulated power supply node in response to a determination that a voltage level of the regulated power supply node has exceeded a threshold value.

7. A method, comprising:
   sourcing, by a plurality of pass circuits having respective outputs coupled to a common regulated power supply node, a plurality of supply currents to the regulated power supply node using a plurality of control signals and a voltage level of an input power supply node;
   generating, by the plurality of pass circuits, a sense current whose value is indicative of a supply current being sourced to the regulated power supply node; and
   generating the plurality of control signals using a voltage level of the regulated power supply node, a reference voltage, and the sense current.

8. The method of claim 7, wherein generating the plurality of control signals includes:
   generating a feedback signal using the voltage level of the regulated power supply node; and
   performing a comparison of the feedback signal to the reference voltage.

9. The method of claim 8, further comprising sinking a control current from a control signal node, wherein a value of the control current is based on a result of the comparison and the sense current.

10. The method of claim 9, further comprising adjusting a value of the control current based on a rate of change of the sense current.

11. The method of claim 7, wherein generating the sense current includes combining respective partial sense currents generated by the plurality of pass circuits.

12. The method of claim 11, further comprising:
   setting a limit for a combined value of the plurality of supply currents during a startup time period by enabling the plurality of pass circuits to generate the respective partial sense currents; and increasing, after a given time period has elapsed, the limit for the combined value of the plurality of supply currents by disabling generation of at least one of the respective partial sense currents.

13. The method of claim 7, further comprising sinking an over-voltage current from the regulated power supply node in response to determining that a voltage level of the regulated power supply node has exceeded a threshold value.

14. An apparatus, comprising:
a pass circuit including:
  a first current source circuit configured to source a first current to a regulated power supply node using a voltage level of an input power supply node and a first control signal; and
  a second current source circuit configured, in response to an activation of an enable signal, to source a second current to the regulated power supply node using the voltage level of the input power supply node and a second control signal, wherein the second current is greater than the first current; and
a control circuit configured to:
  generate a feedback signal using a voltage level of the regulated power supply node;
  generate the first control signal using a reference voltage and the feedback signal; and
  in response to a determination that a total current being sourced to the regulated power supply node exceeds a current threshold value, generate the second control signal using a reference signal.

15. The apparatus of claim 14, wherein the control circuit is further configured to:
  modify a value of the feedback signal in response to the determination that the total current being sourced to the regulated power supply node exceeds the current threshold value; and
  deactivate the second control signal based on a comparison of the reference voltage and a modified value of the feedback signal.

16. The apparatus of claim 15, wherein the control circuit includes a resistive voltage divider circuit configured to generate the feedback signal using the voltage level of the regulated power supply node and, wherein to modify the value of the feedback signal, the control circuit is further configured to change an amount of resistance coupled between the regulated power supply node and a feedback node through which the feedback signal propagates.

17. The apparatus of claim 15, wherein to generate the second control signal, the control circuit is further configured to convert a voltage level of a reference signal to a control current.

18. The apparatus of claim 17, wherein to source the second current to the regulated power supply node, the second current source circuit is further configured to mirror the control current to generate the second current.

19. The apparatus of claim 17, wherein the control circuit is further configured to limit the voltage level of the regulated power supply node using a clamp voltage level.

20. The apparatus of claim 15, wherein to generate the first control signal, the control circuit is further configured to perform a comparison of the reference voltage to the feedback signal.

* * * * *